(12) United States Patent
Motozuka et al.

(10) Patent No.: US 10,749,625 B2
(45) Date of Patent: Aug. 18, 2020

(54) TRANSMISSION DEVICE, RECEPTION DEVICE, TRANSMISSION METHOD, AND RECEPTION METHOD OF HEADER INFORMATION ON CHANNEL AGGREGATION

(71) Applicant: Panasonic Intellectual Property Corporation of America, Torrance, CA (US)

(72) Inventors: Hiroyuki Motozuka, Kanagawa (JP); Naganori Shirakata, Kanagawa (JP); Takenori Sakamoto, Kanagawa (JP); Masataka Irie, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/163,674

(22) Filed: Oct. 18, 2018

(65) Prior Publication Data

US 2019/0052395 A1    Feb. 14, 2019

Related U.S. Application Data

(63) Continuation of application No. PCT/JP2017/022472, filed on Jun. 19, 2017.
(Continued)

(30) Foreign Application Priority Data

Jun. 5, 2017  (JP) .................................. 2017-110961

(51) Int. Cl.
*H04W 4/00*   (2018.01)
*H04L 1/00*   (2006.01)
(Continued)

(52) U.S. Cl.
CPC .............. *H04L 1/0003* (2013.01); *H04J 1/00* (2013.01); *H04L 1/0025* (2013.01);
(Continued)

(58) Field of Classification Search
CPC ....... H04L 1/00; H04L 1/0025; H04L 1/0031; H04L 5/00
See application file for complete search history.

(56) References Cited

U.S. PATENT DOCUMENTS

2009/0060081 A1\* 3/2009 Zhang .................. H04L 1/0026
                                                   375/267
2012/0063358 A1\* 3/2012 Etemad .................. H04L 5/003
                                                   370/254
(Continued)

FOREIGN PATENT DOCUMENTS

JP    2012-015992    1/2012
WO    2011/046396    4/2011

OTHER PUBLICATIONS

International Search Report of PCT application No. PCT/JP2017/022472 dated Sep. 5, 2017.
(Continued)

*Primary Examiner* — Abdelnabi O Musa
(74) *Attorney, Agent, or Firm* — Seed IP Law Group LLP

(57) ABSTRACT

A header encoding unit performs bit scramble and LDPC encoding on the PHY control data to generate L-Header and EDMG-Header data. A modulation unit encodes the L-Header and the E-Header output from the header encoding unit. In addition, the modulation unit duplicates the data of the L-Header and the E-Header in accordance with the bandwidth of the channel notified by an RF control unit and arranges the data on a plurality of channels. The modulation unit further modulates one piece of the payload data divided by a payload data dividing unit.

13 Claims, 22 Drawing Sheets

Related U.S. Application Data

(60) Provisional application No. 62/359,601, filed on Jul. 7, 2016.

(51) Int. Cl.
  *H04L 1/16* (2006.01)
  *H04J 1/00* (2006.01)
  *H04L 5/00* (2006.01)
  *H04B 7/0413* (2017.01)

(52) U.S. Cl.
  CPC .......... *H04L 1/0031* (2013.01); *H04L 1/0039* (2013.01); *H04L 1/0058* (2013.01); *H04L 1/1614* (2013.01); *H04L 5/00* (2013.01); *H04B 7/0413* (2013.01)

(56) References Cited

U.S. PATENT DOCUMENTS

2015/0098703 A1* 4/2015 Wu .................. H04Q 11/00
   398/66
2017/0134235 A1* 5/2017 Wu .................. H04L 27/2621
2017/0207905 A1* 7/2017 Eitan .................. H04L 1/008

OTHER PUBLICATIONS

IEEE Std 802.11ac(TM)-2013, IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 4: Enhancements for Very High Throughput for Operation in Bands below 6 GHz, Dec. 18, 2013.

IEEE 802.11-16/0105r0, "Adding control trailer to control mode PPDUs", Jan. 17, 2016.

IEEE Std 802.11ad(TM)-2012, IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

* cited by examiner

FIG. 4

| CHANNEL STARTING FREQUENCY (GHz) | CHANNEL SPACING (MHz) | CHANNEL SET | SYMBOL RATE FOR SINGLE CARRIER (GHz) |
|---|---|---|---|
| 56.16 | 2160 | 1,2,3,4(,5,6,7,8) | 1.76 |
| 56.16 | 4320 | 9,11(,13,15) | 3.52 |
| 56.16 | 6480 | 17(,20) | 5.28 |
| 56.16 | 8640 | 25(,29) | 7.04 |

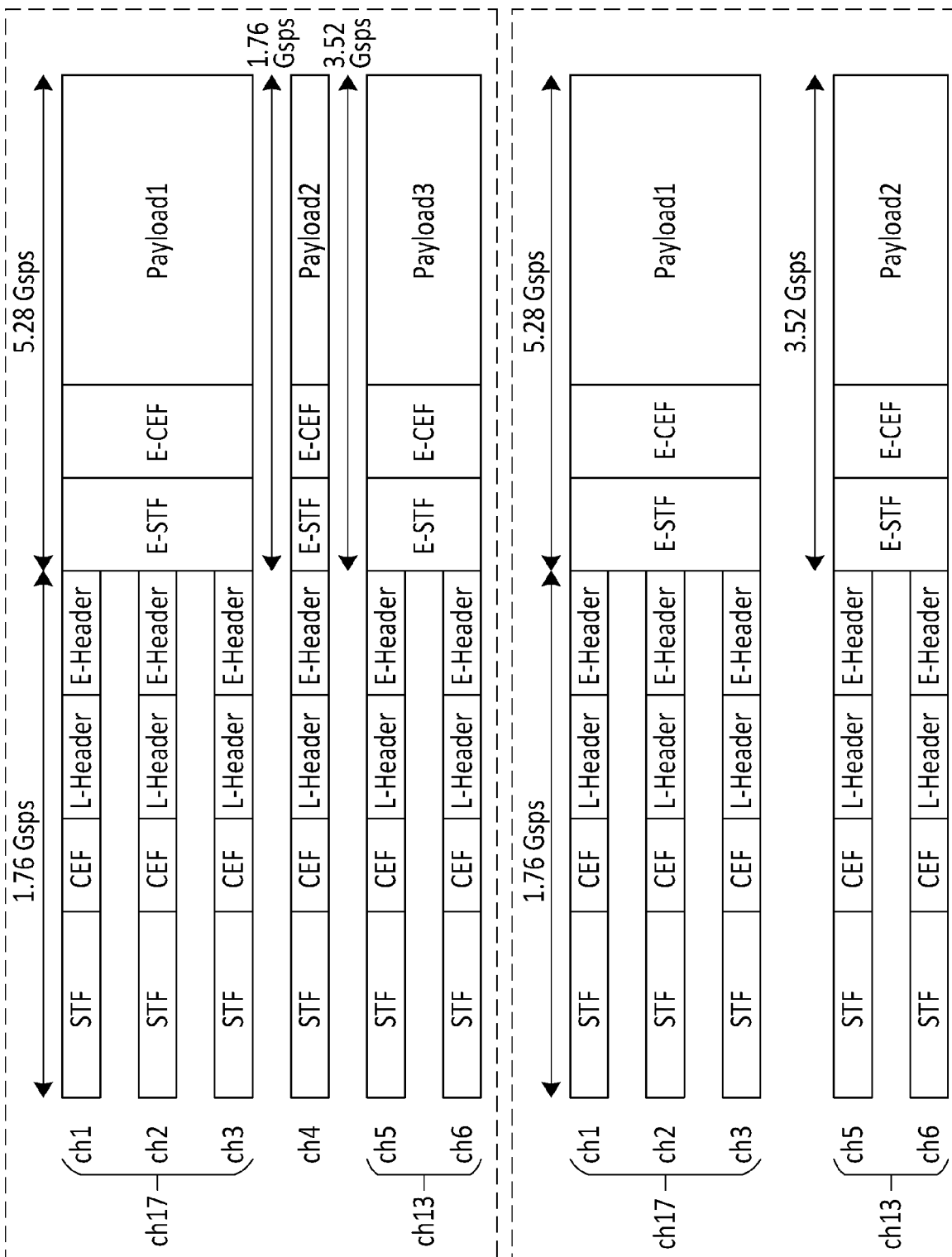

FIG. 8

| FIELD | NUM. OF BITS | DESCRIPTION |
|---|---|---|
| Primary channel number | 3 | 1-7: ch1-7, 0:ch8 |
| BW of 1st carrier | 3 | 0: 2.16 GHz, 1: 4.32 GHz, 2: 6.48 GHz, 3: 8.64 GHz, 4-7: reserved |
| Channel number of 2nd carrier | 5 | 0: 2nd carrier is not available, 1-31: channels ch1-31 |
| Channel number of 3rd carrier | 5 | 0: 3rd carrier is not available, 1-31: channels ch1-31 |
| Channel number of 4th carrier | 5 | 0: 4th carrier is not available, 1-31: channels ch1-31 |
| (the number of total bits) | (21) | |

FIG. 9

| FIELD | NUM. OF BITS | DESCRIPTION |
|---|---|---|
| Primary channel number | 3 | 1-7: ch1-7, 0:ch8 |
| 2.16 GHz channel bitmap | 8 | USE/NON-USE OF ch1 TO ch8 (LSB: ch1, MSB: ch8) IN ADDITION, USE/NON-USE OF ch17, 20, 25, AND 29 IS INDICATED BY COMBINATION OF THIS BITMAP AND 4.32 GHz channel bitmap. |
| 4.32 GHz channel bitmap | 4 | USE/NON-USE OF ch9, 11, 13, AND 15 (LSB: ch9, MSB: ch15) IN ADDITION, USE/NON-USE OF ch17, 20, 25, and 29 IS INDICATED BY COMBINATION OF THIS BITMAP AND 2.16 GHz channel bitmap. |
| (the number of total bits) | (15) | |

FIG. 10A

| ch | INDEX | BITMAP | |
|---|---|---|---|
| 1 | 1 | [1 0 0 0 0 0 0 0] | [0 0 0 0] |
| 2 | 2 | [0 1 0 0 0 0 0 0] | [0 0 0 0] |
| 3 | 4 | [0 0 1 0 0 0 0 0] | [0 0 0 0] |
| 4 | 8 | [0 0 0 1 0 0 0 0] | [0 0 0 0] |
| 5 | 16 | [0 0 0 0 1 0 0 0] | [0 0 0 0] |
| 6 | 32 | [0 0 0 0 0 1 0 0] | [0 0 0 0] |
| 7 | 64 | [0 0 0 0 0 0 1 0] | [0 0 0 0] |
| 8 | 128 | [0 0 0 0 0 0 0 1] | [0 0 0 0] |
| 9 | 256 | [0 0 0 0 0 0 0 0] | [1 0 0 0] |
| 11 | 512 | [0 0 0 0 0 0 0 0] | [0 1 0 0] |
| 13 | 1024 | [0 0 0 0 0 0 0 0] | [0 0 1 0] |
| 15 | 2048 | [0 0 0 0 0 0 0 0] | [0 0 0 1] |

2.16 GHz CHANNEL BITMAP / 4.32 GHz CHANNEL BITMAP

FIG. 10B

| ch | INDEX | BITMAP |
|---|---|---|
| 17 | 257 | [1 0 0 0 0 0 0 0][1 0 0 0] |
| reserved | 258 | [0 1 0 0 0 0 0 0][1 0 0 0] |
| reserved | 259 | [1 1 0 0 0 0 0 0][1 0 0 0] |
| 20 | 1040 | [0 0 0 0 1 0 0 0][0 0 1 0] |
| reserved | 1056 | [0 0 0 0 0 1 0 0][0 0 1 0] |
| reserved | 1072 | [0 0 0 0 1 1 0 0][0 0 1 0] |
| 25 | 516 | [0 0 1 0 0 0 0 0][0 1 0 0] |
| reserved | 520 | [0 0 0 1 0 0 0 0][0 1 0 0] |
| reserved | 524 | [0 0 1 1 0 0 0 0][0 1 0 0] |
| 29 | 2112 | [0 0 0 0 0 0 1 0][0 0 0 1] |
| reserved | 2176 | [0 0 0 0 0 0 0 1][0 0 0 1] |
| reserved | 2240 | [0 0 0 0 0 0 1 1][0 0 0 1] |

FIG. 11A

| ch | INDEX | BITMAP |
|---|---|---|
| reserved | 261 | [10100000][1000] |
| reserved | 262 | [01100000][1000] |
| reserved | 263 | [11110000][1000] |
| reserved | 1048 | [00011000][0010] |
| reserved | 1064 | [00010100][0010] |
| reserved | 1080 | [00011100][0010] |
| reserved | 517 | [10100000][0100] |
| reserved | 521 | [10010000][0100] |
| reserved | 525 | [10110000][0100] |
| reserved | 518 | [01100000][0100] |
| reserved | 522 | [01010000][0100] |
| reserved | 526 | [01110000][0100] |

FIG. 11B

| ch | INDEX | BITMAP |
|---|---|---|
| reserved | 519 | [11100000][0100] |
| reserved | 523 | [11010000][0100] |
| reserved | 527 | [11110000][0100] |
| reserved | 2128 | [00001010][0001] |
| reserved | 2192 | [00001001][0001] |
| reserved | 2256 | [00001011][0001] |
| reserved | 2144 | [00000110][0001] |
| reserved | 2208 | [00000101][0001] |
| reserved | 2272 | [00000111][0001] |
| reserved | 2160 | [00001110][0001] |
| reserved | 2224 | [00001101][0001] |
| reserved | 2288 | [00001111][0001] |

FIG. 13B

| ch | INDEX | BITMAP |
|---|---|---|
| 17 | 263 | [11100000][1000] |
| 20 | 1080 | [00011100][0010] |
| 25 | 527 | [11110000][0100] |
| 29 | 2228 | [00001111][0001] |
| 30 | 799 | [11111000][1100] |

FIG. 13A

| ch | INDEX | BITMAP |
|---|---|---|
| 1 | 1 | [10000000][0000] |
| 2 | 2 | [01000000][0000] |
| 3 | 4 | [00100000][0000] |
| 4 | 8 | [00010000][0000] |
| 5 | 16 | [00001000][0000] |
| 6 | 32 | [00000100][0000] |
| 7 | 64 | [00000010][0000] |
| 8 | 128 | [00000001][0000] |
| 9 | 256 | [00000000][1000] |
| 11 | 512 | [00000000][0100] |
| 13 | 1024 | [00000000][0010] |
| 15 | 2048 | [00000000][0001] |

2.16 GHz CHANNEL BITMAP / 4.32 GHz CHANNEL BITMAP

FIG. 14

| FIELD | NUM. OF BITS | DESCRIPTION |
|---|---|---|
| BW | 3 | 0: 2.16 GHz, 1: 4.32 GHz, 2: 6.48 GHz, 3: 8.64 GHz, 4-7: reserved |
| Primary channel number | 3 | 1-7: ch1-7, 0: ch8 |
| Partial channel number of 2$^{nd}$ carrier | 3 | if the same as primary channel number : 2$^{nd}$ carrier is not available, otherwise: 1-7: ch1-7, 0: ch8 |
| Partial channel number of 3$^{rd}$ carrier | 3 | if the same as primary channel number : 3$^{rd}$ carrier is not available, otherwise: 1-7: ch1-7, 0: ch8 |
| Partial channel number of 4$^{th}$ carrier | 3 | if the same as primary channel number : 4$^{th}$ carrier is not available, otherwise: 1-7: ch1-7, 0: ch8 |
| (the number of total bits) | (15) | |

FIG. 15A

| FIELD | NUM. OF BITS | DESCRIPTION |
|---|---|---|
| Primary channel number | 3 | 1-7: ch1-7, 0:ch8 |
| BW index | 7 | INDEX INDICATING COMBINATION OF BANDWIDTH, NUMBER OF CARRIERS, AND CHANNEL |
| (the number of total bits) | (10) | |

FIG. 15B

| BW INDEX | BANDWIDTH | NUMBER OF CARRIERS |
|---|---|---|
| 0 | 2.16 GHz | 1 |
| 1 TO 7 | | 2 |
| 8 TO 28 | | 3 |
| 29 TO 63 | | 4 |
| 64 | 4.32 GHz | 1 |
| 65 TO 67 | | 2 |
| 68 TO 70 | | 3 |
| 71 | | 4 |
| 72 | 6.48 GHz | 1 |
| 73 | | 2 |
| 74 | 8.64 GHz | 1 |
| 75 | | 2 |
| 76 TO 127 | reserved | |

FIG. 16

| BW INDEX | FIRST CARRIER | SECOND CARRIER | THIRD CARRIER |
|---|---|---|---|
| 8 | ch1 | ch7 | ch8 |
| | ch2 | ch8 | ch1 |
| | ch3 | ch1 | ch2 |
| | ch4 | ch2 | ch3 |
| | ch5 | ch3 | ch4 |
| | ch6 | ch4 | ch5 |
| | ch7 | ch5 | ch6 |
| | ch8 | ch6 | ch7 |
| 9 TO 28 | NOT WRITTEN | NOT WRITTEN | NOT WRITTEN |

FIG. 17

| FIELD | NUM. OF BITS | DESCRIPTION |
|---|---|---|
| Primary channel number | 3 | 1-7: ch1-7, 0:ch8 |
| Maximum bandwidth | 3 | 0: 2.16 GHz, 1: 4.32 GHz, 2: 6.48 GHz, 3: 8.64 GHz, 4-7: reserved |
| 2.16 GHz channel bitmap | 8 | USE/NON-USE OF ch1 TO ch8 (LSB: ch1, MSB: ch8) |
| (the number of total bits) | (14) | |

FIG. 20A

| FIELD | NUMBER OF BITS | THE NUMBER OF CARRIERS | | | |
|---|---|---|---|---|---|
| | | 1 | 2 | 3 | 4 |
| Stream1 MCS | 5 | Carrier #1 | Carrier #1 | Carrier #1 | Carrier #1 |
| Stream2 MCS | 5 | Carrier #1 | Carrier #1 | Carrier #1 | Carrier #1 |
| Stream3 MCS | 5 | Carrier #1 | Carrier #1 | Carrier #1 | Carrier #2 |
| Stream4 MCS | 5 | Carrier #1 | Carrier #1 | Carrier #1 | Carrier #2 |
| Stream5 MCS | 5 | Carrier #1 | Carrier #2 | Carrier #2 | Carrier #3 |
| Stream6 MCS | 5 | Carrier #1 | Carrier #2 | Carrier #2 | Carrier #3 |
| Stream7 MCS | 5 | Carrier #1 | Carrier #2 | Carrier #3 | Carrier #4 |
| Stream8 MCS | 5 | Carrier #1 | Carrier #2 | Carrier #3 | Carrier #4 |

FIG. 20B

| FIELD | NUMBER OF BITS | THE NUMBER OF CARRIERS | | | |
|---|---|---|---|---|---|
| | | 1 | 2 | 3 | 4 |
| Stream1 MCS | 5 | Carrier #1 | Carrier #1 | Carrier #1 | Carrier #1 |
| Stream2 MCS | 5 | Carrier #1 | Carrier #2 | Carrier #2 | Carrier #2 |
| Stream3 MCS | 5 | Carrier #1 | Carrier #1 | Carrier #3 | Carrier #3 |
| Stream4 MCS | 5 | Carrier #1 | Carrier #2 | Carrier #1 | Carrier #4 |
| Stream5 MCS | 5 | Carrier #1 | Carrier #1 | Carrier #2 | Carrier #1 |
| Stream6 MCS | 5 | Carrier #1 | Carrier #2 | Carrier #3 | Carrier #2 |
| Stream7 MCS | 5 | Carrier #1 | Carrier #1 | Carrier #1 | Carrier #3 |
| Stream8 MCS | 5 | Carrier #1 | Carrier #2 | Carrier #2 | Carrier #4 |

FIG. 21A

| FIELD | NUMBER OF BITS | THE NUMBER OF CARRIERS | | | |
|---|---|---|---|---|---|
| | | 1 | 2 | 3 | 4 |
| Stream1 Address | 8 | Carrier #1 | Carrier #1 | Carrier #1 | Carrier #1 |
| Stream2 Address | 8 | Carrier #1 | Carrier #1 | Carrier #1 | Carrier #1 |
| Stream3 Address | 8 | Carrier #1 | Carrier #1 | Carrier #1 | Carrier #2 |
| Stream4 Address | 8 | Carrier #1 | Carrier #1 | Carrier #1 | Carrier #2 |
| Stream5 Address | 8 | Carrier #1 | Carrier #2 | Carrier #2 | Carrier #3 |
| Stream6 Address | 8 | Carrier #1 | Carrier #2 | Carrier #2 | Carrier #3 |
| Stream7 Address | 8 | Carrier #1 | Carrier #2 | Carrier #3 | Carrier #4 |
| Stream8 Address | 8 | Carrier #1 | Carrier #2 | Carrier #3 | Carrier #4 |

FIG. 21B

| FIELD | NUMBER OF BITS | THE NUMBER OF CARRIERS | | | |
|---|---|---|---|---|---|
| | | 1 | 2 | 3 | 4 |
| Stream1 Address | 8 | Carrier #1 | Carrier #1 | Carrier #1 | Carrier #1 |
| Stream2 Address | 8 | Carrier #1 | Carrier #2 | Carrier #2 | Carrier #2 |
| Stream3 Address | 8 | Carrier #1 | Carrier #1 | Carrier #3 | Carrier #3 |
| Stream4 Address | 8 | Carrier #1 | Carrier #2 | Carrier #1 | Carrier #4 |
| Stream5 Address | 8 | Carrier #1 | Carrier #1 | Carrier #2 | Carrier #1 |
| Stream6 Address | 8 | Carrier #1 | Carrier #2 | Carrier #3 | Carrier #2 |
| Stream7 Address | 8 | Carrier #1 | Carrier #1 | Carrier #1 | Carrier #3 |
| Stream8 Address | 8 | Carrier #1 | Carrier #2 | Carrier #2 | Carrier #4 |

TRANSMISSION DEVICE, RECEPTION DEVICE, TRANSMISSION METHOD, AND RECEPTION METHOD OF HEADER INFORMATION ON CHANNEL AGGREGATION

BACKGROUND

1. Technical Field

The present disclosure relates to a transmission device, a reception device, a transmission method, and a reception method using millimeter wave communication.

2. Description of the Related Art

IEEE 802.11 is one of wireless LAN related standards. IEEE 802.11 includes the IEEE802.11ac standard (hereinafter referred to as "11ac standard") and the IEEE 802.11ad standard (hereinafter referred to as "11ad standard").

The 11ac standard is backward-compatible with existing 5-GHz band 802.11 standards and achieves high throughput of 100 Mbps or higher in the MAC layer. According to the 11ac standard, Orthogonal Frequency Division Multiplexing (OFDM) transmission is defined as a secondary modulation scheme.

In addition, in order to increase the peak throughput, the 11ac standard employs channel bonding (CB) in which a data field (Payload) with a bandwidth of 40 MHz to 160 MHz is allocated over two or more contiguous channels each having a bandwidth of 20 MHz, and data is transmitted (refer to, for example, IEEE Std 802.11ac™—2013, IEEE Std 802.11ad™—2012, and IEEE 802.11-16/0105-r00). According to the 11ac standard, to enable a terminal which does not support channel bonding to receive the preamble portion, the preamble portion (including L-STF, L-LTF, L-SIG, and HT-SIG) is allocated to each of the channels.

The 11ad standard achieves high speed communication of up to 7 Gbps by using 60-GHz band millimeter waves. According to the 11ad standard, single carrier transmission and OFDM transmission are defined as the secondary modulation schemes. To further increase the peak throughput from that of the 11ad standard using channel bonding, a communication standard using channel aggregation (CA) has been proposed. Channel aggregation is also referred to as "carrier aggregation".

SUMMARY

However, in existing technology, it is difficult to notify the bonding channels of different bands. Consequently, it is difficult to increase the frequency utilization efficiency. In addition, it is difficult to achieve high throughput by using D/A and A/D with low sampling rate.

One non-limiting and exemplary embodiment provides a transmission device, a reception device, a transmission method, and a reception method capable of notifying bonding channels of different bands, which increases the frequency utilization efficiency.

In one general aspect, the techniques disclosed here feature a transmission device including first to r-th modulation circuits and first to r-th transmission circuits. Each of the first to r-th modulation circuits modulates header information about r carriers, where r is an integer greater than or equal to 1. Each of the r carriers has, allocated thereto, at least one of first, second, and third channel groups each in the same predetermined band. The first channel group includes n channels each having a first bandwidth, where n is an integer. The second channel group includes m channels each formed from two contiguous channels of the first channel group and not duplicated each other, where m is an integer less than n. The third channel group includes p channels each formed from three contiguous channels of the first channel group and not duplicated each other, where p is an integer less than m. The first to r-th transmission circuits transmit pieces of the modulated header information modulated by the first to r-th modulation circuits, respectively. The header information includes n bits indicating allocation of the channels of the first channel group and m bits indicating allocation of the channels of the second channel group. Allocation of the channels of the third channel group is indicated by a combination of the n bits and the m bits.

According to an aspect of the present disclosure, since the bonding channels of different bands are notified, the frequency utilization efficiency can be increased. In addition, high throughput can be achieved by using D/A and A/D with a low sampling rate.

In addition, the combination of channels can be informed by using a small number of bits without limiting the number of carriers.

It should be noted that general or specific embodiments may be implemented as a system, an apparatus, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of Channel set;

FIG. 6C is a diagram illustrating a format of a channel aggregation frame;

FIG. 6D is a diagram illustrating a format of a channel aggregation frame;

FIG. 8 is a diagram illustrating the information about Format 1;

FIG. 9 is a diagram illustrating the information about Format 2;

FIG. 10A is a diagram illustrating the index value and the bitmap value of each of channels;

FIG. 10B is a diagram illustrating the index value and the bitmap value of each of channels;

FIG. 11A is a diagram illustrating the index value and the bitmap value of each of channels;

FIG. 11B is a diagram illustrating the index value and the bitmap value of each of channels;

FIG. 13A is a diagram illustrating the index value and the bitmap value of each of channels;

FIG. 13B is a diagram illustrating the index value and the bitmap value of each of channels;

FIG. 14 is a diagram illustrating the information about Format 4;

FIG. 15A is a diagram illustrating the information about Format 5;

FIG. 15B is a diagram illustrating a relationship between the channel bandwidth of each of the first carrier to fourth carrier and the number of carriers;

FIG. 16 is a diagram illustrating a combination of channels when the BW index is 8;

FIG. 17 is a diagram illustrating the information about Format 6;

FIG. 20A is a diagram illustrating an example of a header format;

FIG. 20B is a diagram illustrating an example of a header format;

FIG. 21A is a diagram illustrating an example of a header format; and

FIG. 21B is a diagram illustrating an example of a header format.

DETAILED DESCRIPTION

An embodiment of the present disclosure is described in detail below with or without reference to the accompanying drawings.

Configuration of Transmission Device

Figure 1:
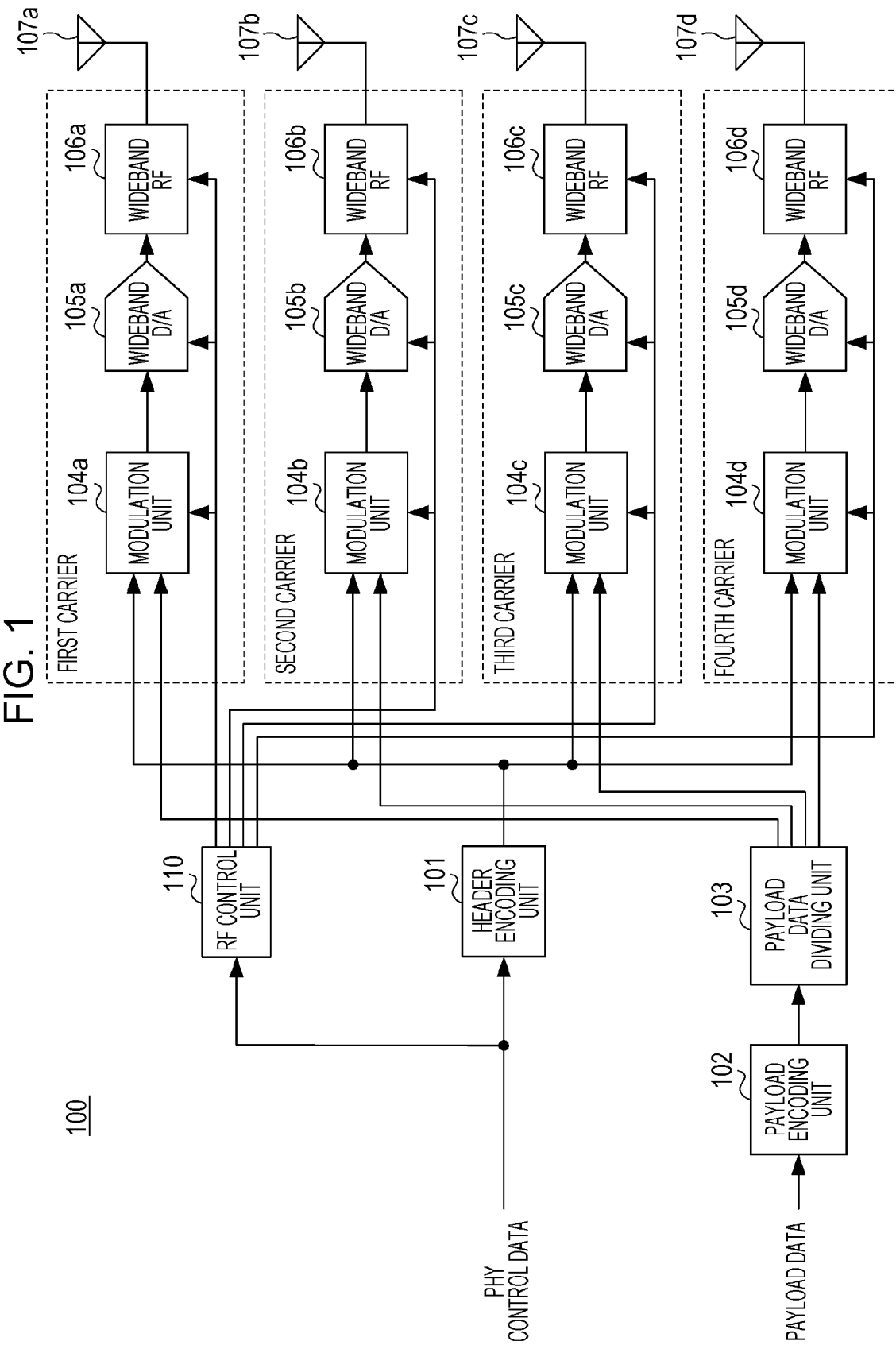
FIG. 1 is a diagram illustrating the configuration of a transmission device that supports channel aggregation.

FIG. 1 is a diagram illustrating the configuration of a transmission device 100 that supports channel aggregation. The transmission device 100 generates PHY control data and payload data in an upper layer processing unit (for example, a MAC layer) (not illustrated).

An RF control unit 110 determines the center frequency (also referred to as "carrier frequency") of a channel used in each of the first to fourth carriers and the bandwidth of the channel on the basis of the PHY control data. Thereafter, the RF control unit 110 sends the information about the combinations of the center frequency and the bandwidth to modulation units 104a to 104d, wideband D/A 105a to 105d, and wideband RFs 106a to 106d. Note that the RF control unit 110 may send a channel number to indicate the information about the combination of the center frequency and the bandwidth of the channel.

A header encoding unit 101 performs bit scrambling and LDPC encoding on the PHY control data to generate L-Header and EDMG-Header data. The generated data is transferred to each of the modulation units 104a to 104d as the same data.

A payload encoding unit 102 performs bit scrambling and LDPC encoding on the payload data. A payload data dividing unit 103 divides the encoded payload data into a maximum of four payload data items and transfers the divided payload data items to the modulation units 104a to 104d. Hereinafter, the division number is referred to as the "number of carriers".

The modulation unit 104a modulates the data for the first carrier. The modulation unit 104a performs encoding on the L-Header and the E-Header output from the header encoding unit 101 first. To perform the encoding, π/2-BPSK may be used as a modulation scheme. In addition, the modulation unit 104a duplicates the data of the L-Header and the E-Header in accordance with the bandwidth of the channel notified from the RF control unit 110 and allocates the data to a plurality of channels. The process performed by the modulation unit 104a is described in detail below together with description of a frame format.

In addition, the modulation unit 104a modulates one of the payload data items divided by the payload data dividing unit 103. The divided payload data item is referred to as "data for the first carrier". The modulation unit 104a may employ π/2-BPSK, π/2-QPSK, π/2-16QAM, or π/2-64QAM as the data modulation scheme. The modulation unit 104a may transmit a symbol obtained after data modulation by a single carrier or may transmit the symbol obtained after data modulation by OFDM.

The wideband D/A 105a, the wideband RF 106a, and an antenna 107a transmit the data for the first carrier by using the first carrier frequency and the channel bandwidth specified by the RF control unit 110. Note that the RF control unit 110 may specify the sampling rate of the wideband D/A instead of specifying the channel bandwidth.

The modulation unit 104b modulates the data for the second carrier. The modulation unit 104b encodes the L-Header and the E-Header output from the header encoding unit 101 first. Since the data of the L-Header and the data of the E-Header are the same as those used by the first carrier, the modulation unit 104b may acquire the modulated data of the L-Header and the modulated data of the E-Header from the modulation unit 104a, instead of performing modulation.

However, when the channel bandwidth of the first carrier differs from the channel bandwidth of the second carrier, the data of L-Header and the data of E-Header modulated for the 2.16 GHz band are acquired from the modulation unit 104a first, and the modulation unit 104b duplicates the modulated data of the L-Header and the modulated data of E-Header and performs channel arrangement in accordance with the channel bandwidth for the second carrier.

In addition, the modulation unit 104b selects, from among the payload data items divided and output by the payload data dividing unit 103, one that differs from the one for the first carrier and modulates the selected payload data item. The payload data item is referred to as "data for the second carrier".

Like the modulation unit 104b, the modulation units 104c and 104d modulate the remaining payload data items (that is, the data for the third carrier and the data for the fourth carrier).

Furthermore, the wideband D/As 105b to 105d, the wideband RFs 106b to 106d, and the antennas 107b to 107d transmit the modulated data for the second to fourth carriers by using the second to fourth carrier frequencies and the second to fourth channel bandwidths specified by the RF control unit 110, respectively.

Each of the antennas 107a to 107d may be an array antenna, that is, each of the antennas 107a to 107d may be composed of a plurality of antenna elements. In addition, the antennas 107a to 107d may have configurations that control the directivities of the antennas 107a to 107d by controlling the phases among the antenna elements and the gains of the antenna elements, respectively.

Furthermore, the RF control unit 110 may control the directivities of the antennas 107a to 107d in accordance with the PHY control data.

Configuration of Reception Device

Figure 2:
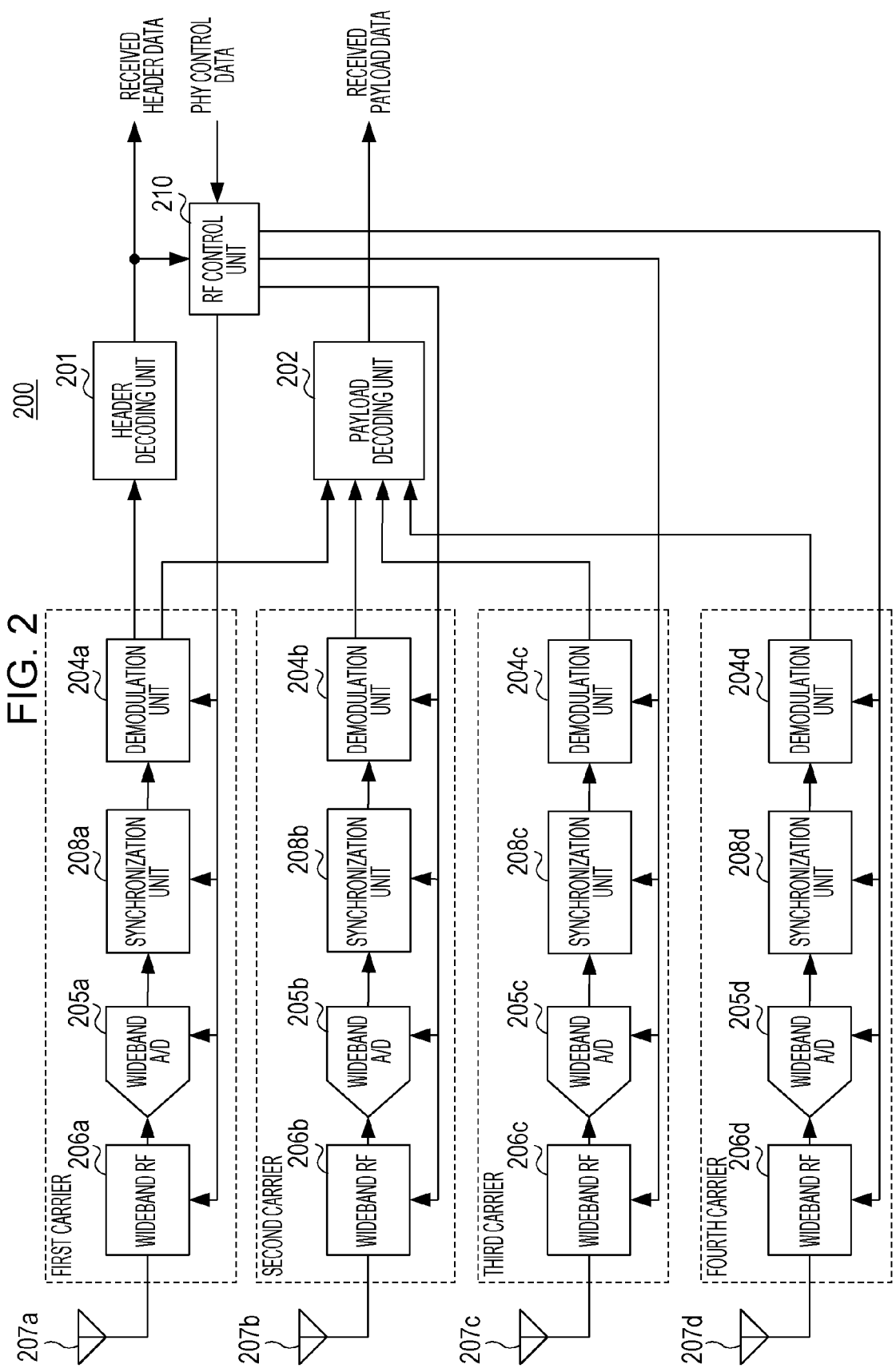
FIG. 2 is a diagram illustrating the configuration of a reception device that supports channel aggregation.

FIG. 2 is a diagram illustrating the configuration of a reception device 200 that supports channel aggregation.

An RF control unit 210 sets up the first carrier so as to receive the L-Header and the E-Header on the basis of the PHY control data first. The L-Header and the E-Header may be received through a predetermined channel called a primary channel. In this case, a demodulation unit 204a, a synchronization unit 208a, a wideband A/D 205a, and a wideband RF 206a for the first carrier are configured to receive one of the single or bonding channels that includes the primary channel and, thereafter, setup of the center frequency and the bandwidth are performed. Note that the RF control unit 210 may set up the second to fourth carriers to receive the L-Header and the E-Header by using a plurality of carriers.

The wideband RF 206a converts the RF signal in the 60 GHz band and outputs a baseband signal. The wideband A/D 205a performs A/D (analog/digital) conversion on the baseband signal. The synchronization unit 208a detects the preamble from the converted digital baseband signal and estimates and corrects the carrier frequency offset for the converted digital baseband signal by using the detected preamble. The demodulation unit 204a includes an equalizer and a data demodulation unit. The demodulation unit 204a performs, for example, equalization, estimation and correction of symbol synchronization shift, and data demodulation on the signal output from the synchronization unit 208a.

A header decoding unit 201 extracts the header information from the demodulated data output from the demodulation unit 204a and performs LDPC decoding (error correction), CRC check (error detection), and analysis of the header format by using the extracted header information. In this manner, the header decoding unit 201 acquires the PHY header information. The PHY header information includes channel information about each of the first to fourth carriers (information about the center frequency and bandwidth or information about the channel number).

After the header is decoded, the RF control unit 210 sets up the demodulation units 204a to 204d, the synchronization units 208a to 208d, the wideband A/Ds 205a to 205d, and the wideband RFs 206a to 206d for the first to fourth carriers on the basis of the channel information about the first to fourth carriers, respectively. The setting information includes the center frequency of the channel used for the carrier and information about the channel bandwidth. Note that instead of using such information, the channel number may be used. Still note that the value obtained from the header decoding unit 201 may be used as the channel information about each of the first to fourth carriers. If the channel information is notified in advance before receipt of the header, the channel information included in the PHY control data input from a MAC processing unit (not illustrated) may be used.

The demodulation units 204a to 204d, the synchronization units 208a to 208d, the wideband A/Ds 205a to 205d, and the wideband RFs 206a to 206d receive a frame subjected to channel aggregation in accordance with the center frequency and the channel bandwidth of the channel set up for each of the channels on the basis of the decoded header information.

The demodulated data output from the demodulation units 204a to 204d are gathered in a payload decoding unit 202. The payload decoding unit 202 performs LDPC decoding (error correction) and descrambling and transfers the obtained data to the MAC processing unit as received payload data.

Channelization

Figure 3:
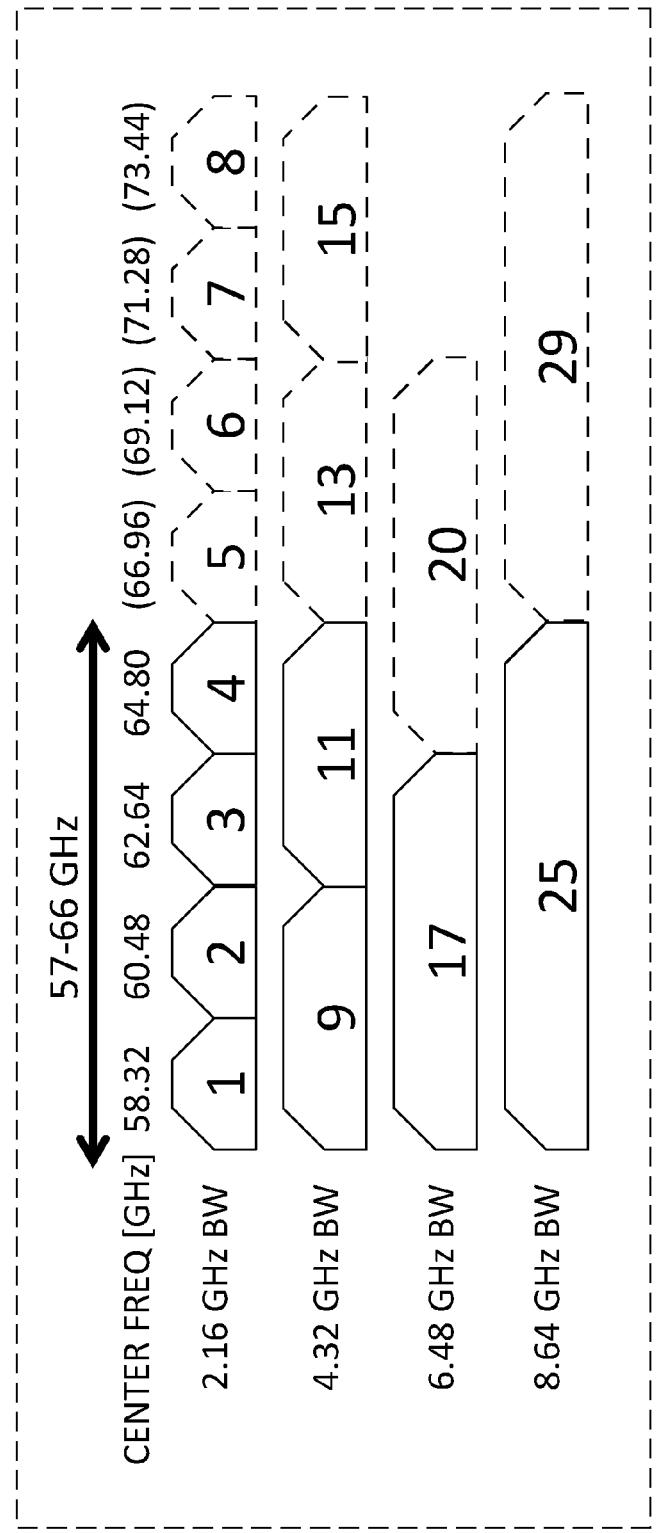
FIG. 3 is a diagram illustrating channelization.

FIG. 3 is a diagram illustrating channelization. According to the IEEE 802.11ad—2012 standard, ch1 to ch4 are used. The center frequencies of ch1 to ch4 are 58.32 GHz, 60.48 GHz, 62.64 GHz, and 64.80 GHz, respectively. In addition, the channel spacing of each of ch1 to ch4 is 2.16 GHz. For convenience of description, the channel bandwidth of each of ch1 to ch4 is defined to be 2.16 GHz. Each of the channels can transmit a single carrier signal at a symbol rate of 1.76 Gsps (samples per second) or an OFDM signal modulated at a sampling rate of 2.64 Gsps (band-limited to about 1.8 GHz).

Ch9 and ch11 are channels used to perform channel bonding to provide a channel bandwidth of 4.32 GHz. The center frequencies are 59.40 GHz and 63.72 GHz, respectively. That is, ch9 uses the bands of ch1 and ch2, and ch11 uses the bands of ch3 and ch4. In addition, ch10, which uses the bands of ch2 and ch3, is a channel having a center frequency of 61.56 GHz and a channel bandwidth of 4.32 GHz. However, ch10 is not used because it partially overlaps the bands of ch9 and ch11.

Ch17 is a channel used to perform channel bonding to provide a channel bandwidth of 6.48 GHz. The center frequency is 60.48 GHz. That is, ch17 uses the bands of ch1, ch2, and ch3. In addition, ch18 which has the combined bands of ch2, ch3 and ch4 and ch19 which has the combined bands of ch3, ch4 and ch5 have center frequencies of 62.64 GHz and 64.80 GHz, respectively, and the channel bandwidths with the same value of 6.48 GHz. However, ch18 and ch19 are not used because the bands of ch18 and ch19 overlap with the band of ch17.

Ch25 is a channel used to perform channel bonding to provide a channel bandwidth of 8.64 GHz. The center frequency is 61.56 GHz. That is, ch25 uses the bands of ch1, ch2, ch3, and ch4.

Ch5 to ch8 are not used in the IEEE 802.11ad standard. These channels are to be used when the transmission device 100 can be used in a band other than 57 to 66 GHz band in the future. The center frequencies and bandwidths of the channels are not determined yet. For convenience of description, it is assumed that like ch1 to ch4, the bandwidths are 2.16 GHz, and ch5 to ch8 are arranged adjacent to ch4 in the high frequency band. In addition, the center frequencies of ch5 to ch8 are set to 66.96 GHz, 69.12 GHz, 71.28 GHz, and 73.44 GHz, respectively.

That is, for convenience of description, ch1 to ch8 are to be arranged contiguously at intervals of 2.16 GHz. However, non-contiguous bands may be used. For example, as illustrated in FIG. 3, ch5 and ch6 may be contiguous channels, and ch7 and ch8 may be arranged in distant bands (the spacing between ch6 and ch7 is 2.16 GHz or more).

If ch5 to ch8 are present, the bonding channels ch13, ch15, ch20 and ch29 are defined as illustrated by the dotted lines in FIG. 3.

The correspondence between the center frequency of each of the channels (ch1 to ch8 each having a bandwidth of 2.16 GHz) illustrated in FIG. 3 and the channel number is determined as follows:

Channel center frequency=Channel starting frequency+Channel spacing×Channel number     Equation 1.

The correspondence between the center frequency of each of the channels (ch9 to ch16 each having a bandwidth of 4.32 GHz) illustrated in FIG. 3 and the channel number is determined as follows:

Channel center frequency=Channel starting frequency+(Channel spacing/2)×(Channel number mod 8)+1.08 GHz     Equation 2.

The correspondence between the center frequency of each of the channels (ch17 to ch24 each having a bandwidth of 6.48 GHz) illustrated in FIG. 3 and the channel number is determined as follows:

Channel center frequency=Channel starting frequency+(Channel spacing/3)×(Channel number mod 16)+2.16 GHz     Equation 3.

The correspondence between the center frequency of each of the channels (ch25 to ch31 each having a bandwidth of 8.64 GHz) illustrated in FIG. 3 and the channel number is determined as follows:

Channel center frequency=Channel starting frequency+(Channel spacing/4)×(Channel number mod 24)+3.24 GHz     Equation 4.

For example, as illustrated in FIG. 4, for each of ch1 to ch8, the row having the channel number (1 to 8) in the "channel set" column is referenced. Thus, the channel spacing is determined to be 2160 MHz, and the channel starting frequency is determined to be 56.16 GHz. Thereafter, since the bandwidth is 2.16 GHz, the channel center frequency (the center frequency of the channel) is calculated by substituting the channel number (1 to 8) into the term "Channel number" of Equation 1.

Example of Channel Aggregation

FIGS. 5A to 5D are diagrams illustrating examples of channel aggregation performed by using the transmission device 100.

Figure 5A:
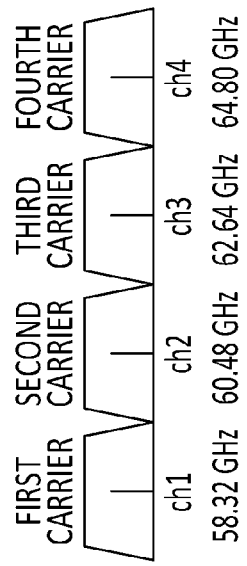
FIG. 5A is a diagram illustrating an example of channel aggregation performed by using the transmission device.

In FIG. 5A, the first carrier uses ch1, the second carrier uses ch2, the third carrier uses ch3, and the fourth carrier uses ch4. Each of the carriers transmits with a channel width of 2.16 GHz. The first to fourth carriers correspond to the first to fourth carriers illustrated in FIG. 1 (the transmission device).

In FIG. 5A, by aggregating up to 4 carriers, the throughput can be increased to four times the original. Since the channel width of each of the carriers is 2.16 GHz (the symbol rate is 1.76 G symbols/second), high-speed communication can be performed by using D/A and A/D converters that operate at a speed the same as defined by the 11ad standard (for example, 2.64 G samples/second, 1.5 times the symbol rate of a single carrier), without using high-speed D/A and A/D converters used in channel bonding. In addition, by stopping transmission performed by some of the carriers in accordance with the amount of data transmitted, low power consumption can be achieved. Note that in channel bonding, when, for example, ch9 is switched to ch1, the center frequency is changed. Accordingly, a switching delay is required.

Figure 5B:
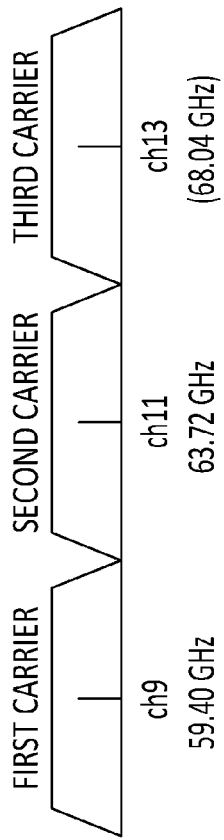
FIG. 5B is a diagram illustrating an example of channel aggregation performed by using the transmission device.

Each of the carriers may use channel bonding. In FIG. 5B, a throughput approximately six times higher than the throughput defined by the 11ad standard is achieved by transmitting signals in bonding channels each having a channel width of 4.32 GHz (a symbol rate of single carrier of 3.52 G samples/second) by using three carriers. Note that to achieve this throughput by channel bonding, D/A and A/D converters capable of receiving a signal of a channel width of 12.96 GHz (for example, a symbol rate of single carrier of 10.56 G symbols/second) are used. Consequently, it is difficult to achieve a small body and low power consumption. In contrast, since high throughput can be achieved by using D/A and A/D converters that operate at a relatively low sampling rate, low power consumption can be achieved.

Figure 5C:
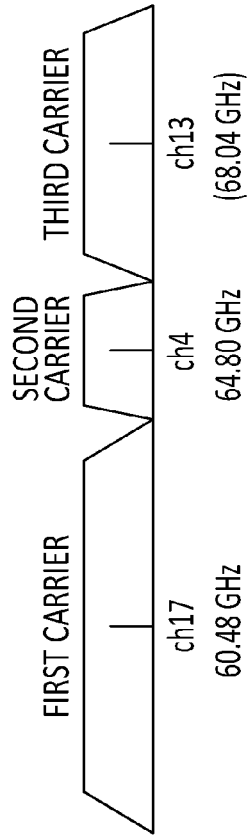
FIG. 5C is a diagram illustrating an example of channel aggregation performed by using the transmission device.

In addition, the carriers may use different channel widths (different symbol rates, different channel bonding levels). In FIG. 5C, a combination of ch17 (3-channel bonding), ch4, and ch13 (2-channel bonding) is illustrated.

First, in the case where the total number of available channels is an odd number, such as five channels (10.8 GHz=2.16 GHz×5), the maximum throughput can be obtained by combining four channels (8.64 GHz) and one channel (2.16 GHz) or combining three channels (6.48 GHz) and two channels (4.32 GHz).

Secondly, in the case where the signals on the carriers are transmitted to different users (described in more detail in section "MCS Notification of Multi-User Transmission" below), the throughput can be increased and the channel utilization efficiency can be increased by appropriately selecting the channel width of each of the carriers in accordance with the supporting ability (the number of channels that can be bonded) of each of users and the data amount for each of the users.

Figure 5D:
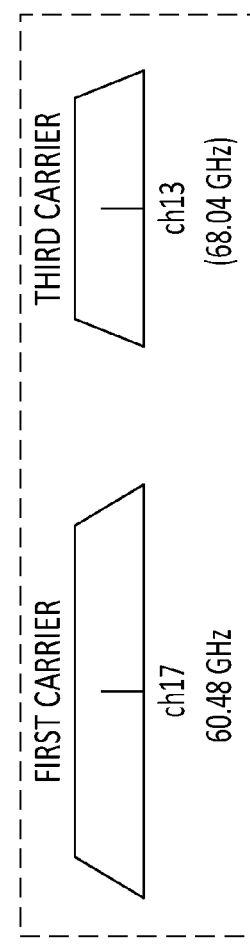
FIG. 5D is a diagram illustrating an example of channel aggregation performed by using the transmission device.

Thirdly, as illustrated in FIG. 5D, it is possible to arrange carriers while avoiding congested channels (e.g., ch4). As a result, the channel utilization efficiency can be increased.

Frame Format

Figure 6A:
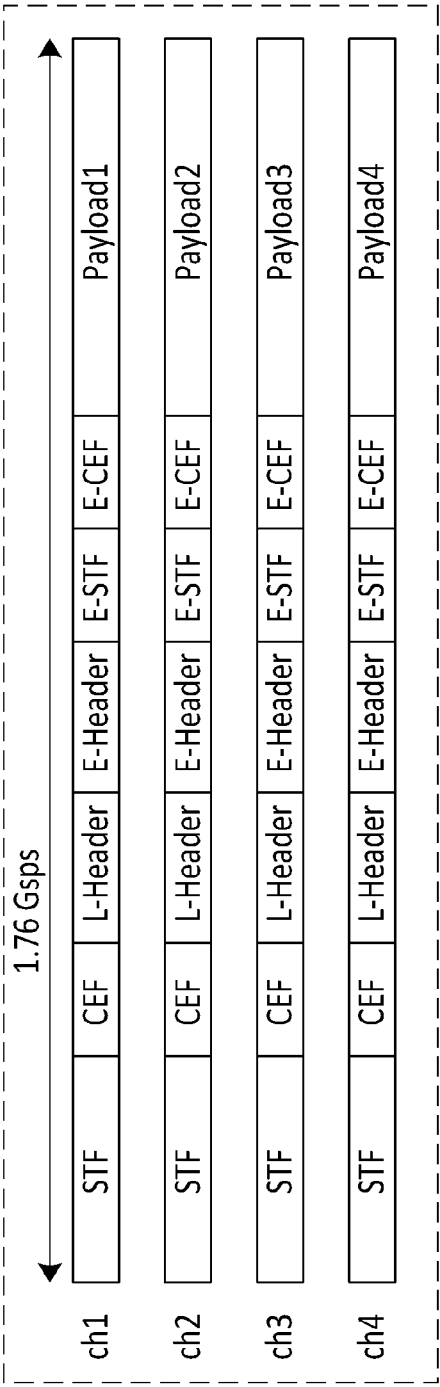
FIG. 6A is a diagram illustrating a format of a channel aggregation frame.

The format of a PHY frame in channel aggregation performed by the transmission device 100 (hereinafter referred to as a "channel aggregation frame") is illustrated in FIGS. 6A to 6D. FIG. 6A corresponds to FIG. 5A, FIG. 6B corresponds to FIG. 5B, FIG. 6C corresponds to FIG. 5C, and FIG. 6D corresponds to FIG. 5D.

Data from the STF to the E-Header is transmitted on all channels by using the same signal and the same modulation scheme. Note that the reception device need not receive data other than data on the primary channel. Note that the primary channel is one of the channels of a 2.16 GHz width and is predetermined. For example, in FIG. 6A, the primary channel is any one of ch1 to ch4. Furthermore, in FIG. 6B, the primary channel is any one of ch1 to ch6.

Figure 6B:
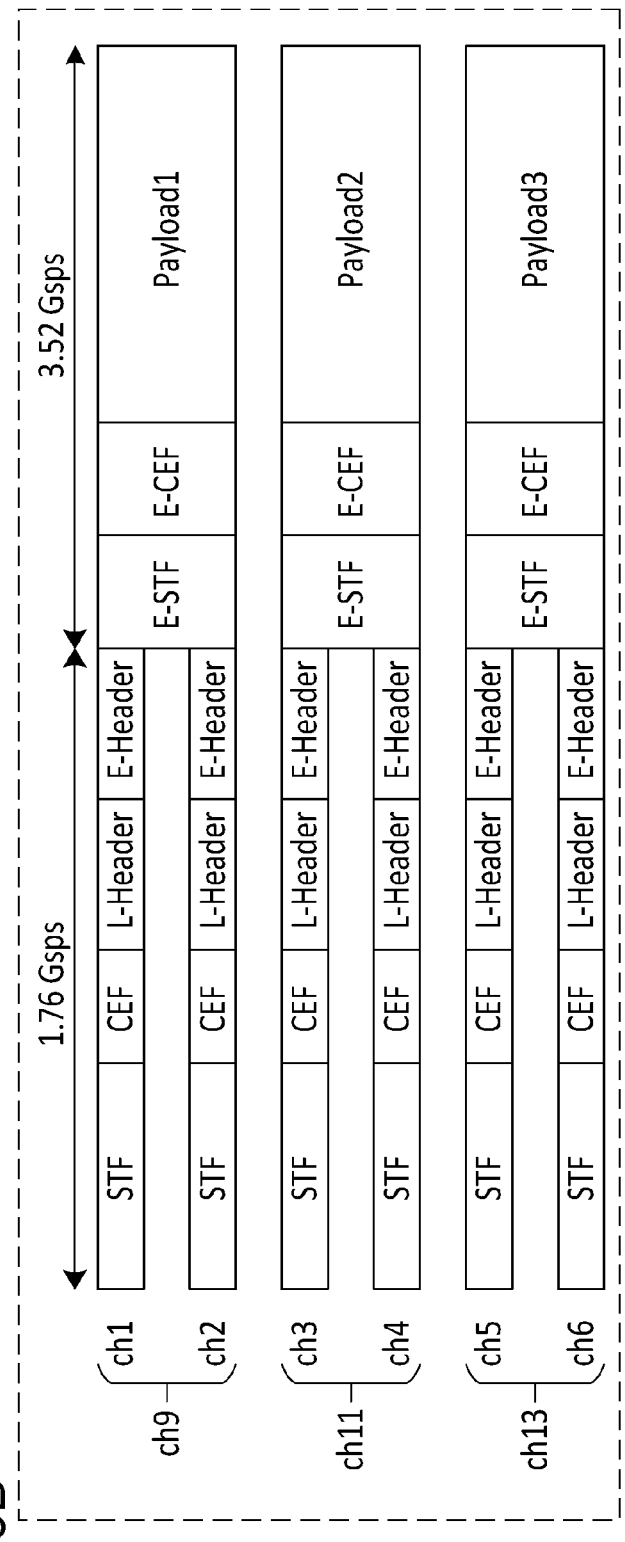
FIG. 6B is a diagram illustrating a format of a channel aggregation frame.

The transmission device sets the channel selection information in the E-Header and transmits the E-Header. For example, in FIG. 6A, information indicating that ch1, ch2, ch3, and ch4 are selected is set. In FIG. 6B, information indicating that ch9, ch11, and ch13 are selected is set. Note that, for STAs that do not perform association with the transmission device, Primary Channel information may be set in the E-Header. A technique for sending the channel selection information is described in detail below.

Note that the channel selection information may be included in the L-Header instead of the E-Header.

In FIG. 6A, in the first carrier to the fourth carrier, the header (L-Header and E-Header) and the payload (from Payload 1 to Payload 4) are modulated by a single carrier modulation scheme at a symbol rate of 1.76 Gsps and are transmitted in the 2.16 GHz bandwidth.

In FIG. 6B, in the first carrier to the third carrier, the payload (Payload 1 to Payload 3) is modulated by a single carrier modulation scheme at a symbol rate of 3.52 Gsps and are transmitted in the 4.32 GHz bandwidth. The header is single-carrier-modulated at a symbol rate of 1.76 Gsps and is transmitted on ch1 to ch6 which are 2.16 GHz channels corresponding to ch9, ch11 and ch13.

In FIG. 6C, in the first, second and third carriers, Payload 1, Payload 2 and Payload 3 are modulated by using single carrier modulation schemes at symbol rates 5.28 Gsps, 1.76 Gsps, and 3.52 Gsps, respectively. Thereafter, Payload 1, Payload 2 and Payload 3 are transmitted in 6.48 GHz, 2.16 GHz, and 4.32 GHz bandwidths, respectively. The header is single-carrier-modulated at a symbol rate of 1.76 Gsps and is transmitted in ch1 to ch6 which are 2.16 GHz channels corresponding to ch17, ch4, and ch13.

In FIG. 6D, in the first and second carriers, Payload 1 and Payload 2 are modulated by single carrier modulation schemes at a symbol rate of 5.28 Gsps and 3.52 Gsps, respectively. Thereafter, Payload 1 and Payload 2 are transmitted in bandwidths of 6.48 GHz and 4.32 GHz, respectively. The header is single-carrier-modulated at a symbol rate of 1.76 Gsps and is transmitted on ch1, ch2, ch3, ch5, and ch6 which are 2.16 GHz channels corresponding to ch17 and ch13.

As described above, even when different bandwidths are used for the carriers, the header is transmitted in a bandwidth of 2.16 GHz. Consequently, by receiving a signal on any one of the channels of the 2.16 GHz band included in the carrier aggregation frame, the information about the header can be obtained and, thus, the channel selection information in the channel aggregation frame can be obtained.

Note that STF (Short Training Field) and CEF (Channel Estimation Field) are equivalent to the signals defined in the IEEE 802.11ad standard. These signals are used for signal synchronization and demodulation of the L-Header and E-Header.

E-STF (EDMG STF) and E-CEF (EDMG CEF) are used for signal synchronization and payload demodulation (channel estimation) and are transmitted over the same signal bandwidth as the payload.

Channel Selection Information Notification Method

A method for sending the channel selection information from the transmission device to the reception device is described below.

Method 1

As described above, the channel selection information is sent by using the E-Header (or L-Header) of a data packet.

Figure 7A:
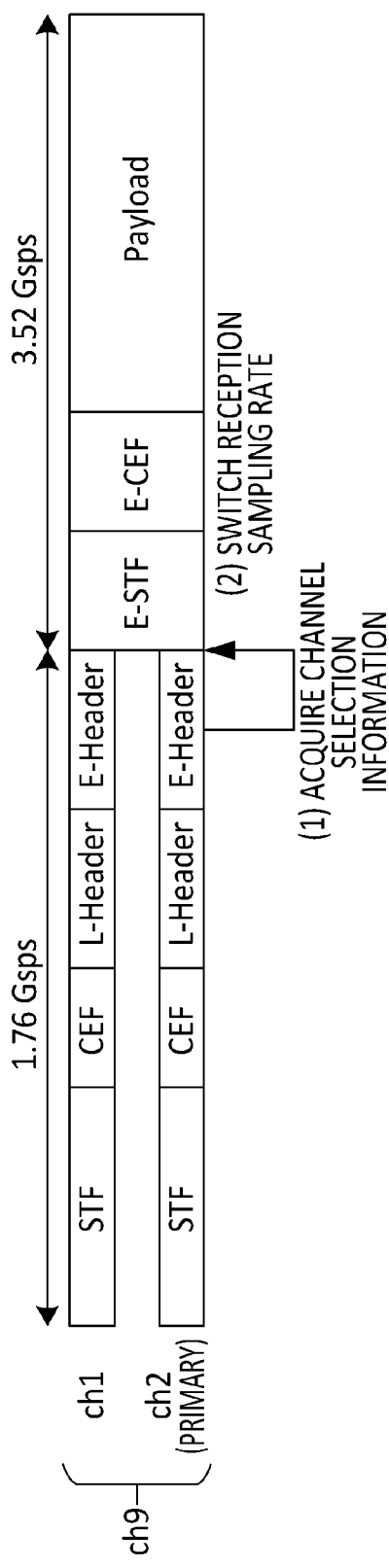
FIG. 7A is a diagram illustrating a method for notifying the reception device of channel selection information by the transmission device.

In this case, as illustrated in FIG. 7A, the reception device 200 receives and decodes the E-Header on the Primary Channel and acquires the channel selection information. The reception device 200 changes the sampling rate of the A/D converter in accordance with the acquired channel selection information at the time of starting reception of the E-STF.

Note that the A/D converter may be set up in advance (before reception of the header) such that the sampling rate is 3.52 Gsps or the maximum sampling rate that the reception device 200 supports, and the filter may be switched between a digital filter and an analog filter.

Method 2

Before sending a data packet, the channel to be used is informed by the preceding packet.

Figure 7B:
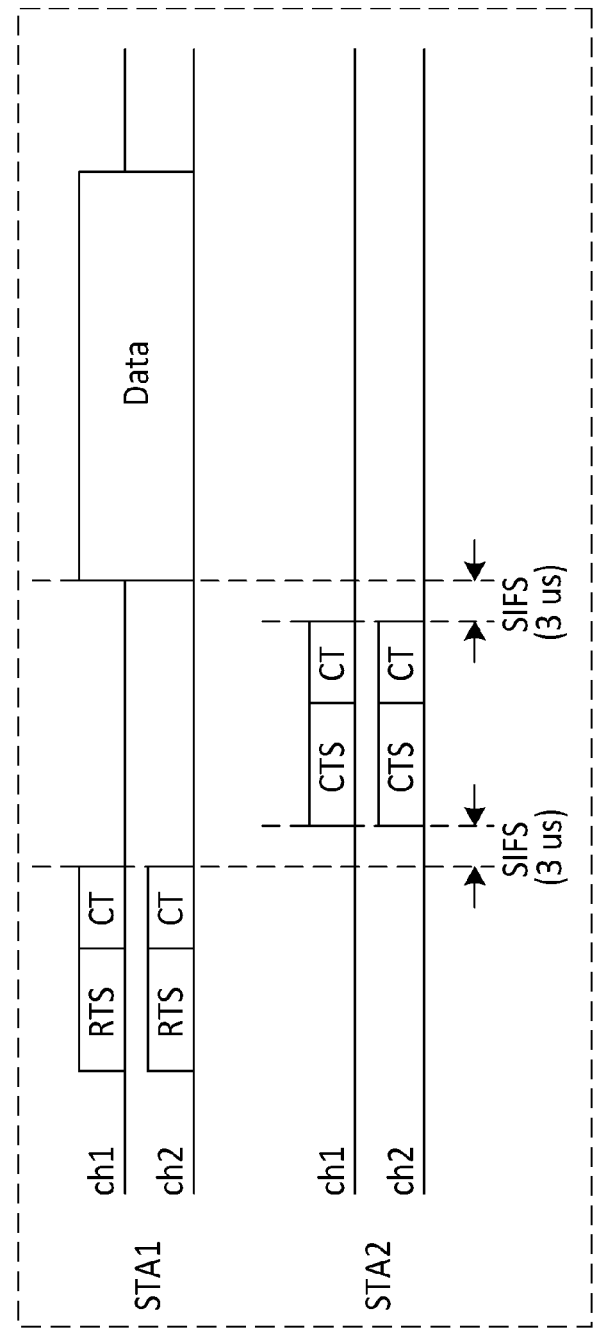
FIG. 7B is a diagram illustrating a method for notifying the reception device of channel selection information by the transmission device.

In this case, the method described in IEEE Std 802.11ac™—2013 is used. That is, as illustrated in FIG. 7B, the transmission device 100 adds CT (Control Trailer) to the RTS (Request To Send) frame which conforms to the 11ad standard. At this time, the information about the channel to be used for transmission of a data packet is included in CT. In order to acquire the transmission right in ch1 and ch2, STA 1 transmits, to ch1 and ch2, an RTS frame having CT added thereto. STA 2 receives the RTS frame and transmits the CTS having CT added thereto to ch1 and ch2 so as to permit transmission from STA 1 on ch1 and ch2. Each of the CTs includes information indicating that channel bonding is performed using ch1 and ch2. After receiving the CTS, STA 1 performs channel bonding using ch1 and ch2 and transmits the data packet.

The spacing between RTS and CTS and the spacing between CTS and a data packet (refer to FIG. 7B) is defined as SIFS (short interframe space) and is prescribed to be about 3 µs in transmission.

STA 2 may switch the configuration and settings (e.g., the sampling rate) of the reception device during the SIFS immediately after reception of the RTS. That is, STA 2 normally stands by on the primary channel (e.g., ch2). STA 2 receives the RTS frame on ch2. STA 2 switches the channel to be used during the SIFS immediately after reception of the RTS. Thereafter, STA 2 sends CTS to ch1 and ch2. In addition, STA 2 receives data on ch1 and ch2. If the transmission right (TXOP) acquired by the STA 1 expires, STA 2 returns to the standby mode on the primary channel.

Format 1 Indicating Channel Selection Information

As illustrated in FIG. 8, the information consisting of five fields (Primary channel number, BW of 1st carrier, Channel number of 2nd carrier, Channel number of 3rd carrier, Channel number of 4th carrier) is called "Format 1". The transmission device 100 sends the information about the first carrier to the fourth carrier and the information about the primary channel by using Format 1. Format 1 is transmitted as part of E-Header (or L-Header) and CT (Control Trailer).

In addition, the reception device 200 receives Format 1. Subsequently, the reception device 200 acquires the information about the first carrier to the fourth carrier and the information about the primary channel from the information in Format 1.

Description of Fields

The Primary channel number field includes the value indicating the primary channel number (one of ch1 to ch8). Note that the value 0 may represent ch8. In addition, if the channels available are ch1 to ch4, the values 5 to 7 and 0 are reserved numbers and may be used for future expansion.

The BW-of-1st-carrier field indicates the channel bandwidth (BW: Bandwidth) of the first carrier. The value 0 represents 2.16 GHz, the value 1 represents 4.32 GHz, the value 2 represents 6.48 GHz, and the value 3 represents 8.64 GHz. The values 4 to 7 are reserved and may be used for future expansion.

The channel number of the first carrier can be determined by a combination of the value of the Primary channel number field and the value of the BW-of-1st-carrier field. For example, when the primary channel is 3 and the first carrier is ch11, the transmission device 100 sets 3 in the Primary channel number field, sets 1 in the BW-of-1st-carrier field, and transmits Format 1. The reception device 200 refers to the received value and the channelization information illustrated in FIG. 3. If the Primary channel number field is 3 and the BW-of-1st-carrier field is 1, the reception device 200 determines that the first carrier is ch11. That is, the channel of the first carrier is determined such that the band of the primary channel is at least partially included in the band of the first carrier.

The channel-number-of-2nd-carrier field indicates the channel number of the second carrier. If transmission on the second carrier is not performed, the value of the channel-number-of-2nd-carrier field is 0. However, if transmission on the second carrier is performed, the transmission device 100 selects any one of the available channel numbers (for example, ch1, ch2, ch3, ch4, ch9, ch11, ch17, and ch25 indicated by solid lines in FIG. 3) and sets the selected value in the channel-number-of-2nd-carrier field. Alternatively, for future extension, any one of the values 1 to 31 may be set to notify the channel number not included in FIG. 3. For example, channel numbers ch30 and ch31 not illustrated in FIG. 3 may be newly defined.

Like the channel-number-of-2nd-carrier field, the channel-number-of-3rd-carrier field and the channel-number-of-4th-carrier field indicate the channel numbers of the third and fourth carriers, respectively. If the third and fourth carriers are not present, the value in each of the corresponding fields is 0.

By using Format 1, the transmission device 100 sets the channel numbers of the second, third, and fourth carriers and sends Format 1. In addition, by using the numbers from ch1 to ch31 including the channel numbers illustrated in FIG. 3 for the channel numbers of the second, third and fourth carriers, each of the carriers of channel aggregation can be formed by a bonding channel. Thus, the channel utilization efficiency can be increased, and the data transfer rate can be increased.

Furthermore, by using Format 1, the transmission device 100 sends the primary channel number and the index representing the channel bandwidth. Consequently, the transmission device 100 need not send the channel number of the first carrier. Thus, the number of bits of the control information to be transmitted can be reduced and, therefore, the data transfer rate can be improved.

Format 2 Indicating Channel Selection Information

Another method for sending the information about the first carrier to the fourth carrier and the information about the primary channel is described below. The transmission device 100 sends the information about the first carrier to the fourth carrier and the information about the primary channel by using Format 2 illustrated in FIG. 9. Format 2 is transmitted as part of the E-Header (or L-Header) and CT (Control Trailer) illustrated in FIGS. 6A and 6B. The Primary channel number field indicates the Primary channel number.

The 2.16 GHz channel bitmap field represents ch1 to ch8. If one of ch1 to ch8 is used by any one of the first carrier to the fourth carrier, the corresponding bit is set to 1. For example, if the first carrier uses ch1 and the second carrier uses ch3, the value in the 2.16 GHz channel bitmap field is set to 00000101 in binary. That is, the LSB represents ch1, and the MSB represents ch8.

The 4.32 GHz channel bitmap field represents ch9, ch11, ch13, and ch15. If one of ch9, ch11, ch13, and ch15 is used by any one of the first carrier to the fourth carrier, the corresponding bit is set to 1. For example, if the first carrier uses ch15 and the second carrier uses ch11, the value of 4.32 GHz channel bitmap is set to 1010 in binary. That is, the LSB represents ch9, and the MSB represents ch15.

If channel aggregation is performed by a combination of 2.16 GHz and 4.32 GHz, the corresponding bit in each of the 2.16 GHz channel bitmap and the 4.32 GHz channel bitmap is set to 1. For example, if ch13 is used for the first carrier and if ch2 is used for the second carrier, "00000010" and "0100" are set in the 2.16 GHz channel bitmap and the 4.32 GHz channel bitmap, respectively.

The values of the 2.16 GHz channel bitmap and the 4.32 GHz channel bitmap of Format 2 may be determined by a correspondence between the channel number and the integer value, as in the "ch" column and "index" column illustrated in FIG. 10A. The integer value defined in FIG. 10A is referred to as an "index". In the "bitmap" column of FIG. 10A, the values for 2.16 GHz and 4.32 GHz channel bitmap fields are set forth. The left end bit represents the LSB, and the right end bit represents the MSB. The index values are obtained in the following manner. That is, 2.16 GHz and 4.32 GHz channel bitmaps are concatenated to form a single bitmap first. The bits in a 4.32 GHz channel bitmap portion are considered as high-order bits, and the bits in a 2.16 GHz channel bitmap portion are considered as low-order bits. The combined bits are converted into a decimal value, which serves as the index value. For example, in the case of ch1, since the LSB of the bitmap is 1, the index is the integer 1.

6.48 GHz, 8.64 GHz Channel bonding is notified as follows. That is, invalid combinations among the plurality of combinations of the 2.16 GHz channel bitmap field and the 4.32 GHz channel bitmap field are predefined so as to represent 6.48 GHz, 8.64 GHz channel bonding. For example, the combination of ch9 and ch1 is invalid because the band of ch1 overlaps the band of ch9. Accordingly, the combination of ch9 and ch1 is predefined so as to indicate ch17. At this time, the value of the bitmap is 00000001,0001.

Likewise, the values of the bitmaps of ch20, ch25, and ch29 are determined as illustrated in FIG. 10B. FIG. 10B illustrates the index value for the bitmaps of the 6.48 GHz channel and the 8.64 GHz channel. For example, the index of ch17 is 257, which is a value obtained by summing the indices of ch1 and ch9. Since, as described above, aggregation of ch1 and ch9 is invalid, the value is used as an index indicating ch17.

Channel aggregation using a plurality of the above-described channels (ch1 to ch29 illustrated in FIG. 3) including 6.48 GHz or 8.64 GHz channel bonding can be specified by summing the values of indices illustrated in FIGS. 10A and 10B.

For example, an index representing the channel aggregation of ch1 (the index value is 1) and ch3 (the index value is 4) is 5 (the sum of the two index values).

In addition, an index representing the channel aggregation of ch4 (the index value is 8) and ch13 (the index value is 1024) is 1032 (the sum of the two index values).

Furthermore, an index representing the channel aggregation of ch25 (index=516), ch13 (index=1024), and ch7 (index=64) is 1604 (=516+1024+64).

The sum of index values may be the sum of integers or the sum of logical values. This is because, since there is no duplication of bits, the sum of integers is the same as the sum of logical values.

The index of the aggregation of a combination of any channels illustrated in FIGS. 10A and 10B is determined by summing the indices. For example, since the indices of ch17 and ch4 are 257 and 8, respectively, the index of the aggregation of ch17 and ch4 is 265. In the case where the reception device 200 receives an index value of 265, since the index is not included in FIG. 10A and FIG. 10B, the reception device 200 can determine that an index of 265 is an index representing aggregation.

As described above, the bitmap of the first bandwidth and the bitmap of the second bandwidth are directly notified, and the channel of the third bandwidth is notified by the above-described combination.

While the transmission device 100 has been described with reference to the configuration capable of transmitting a maximum of four carriers as an example, a transmission device capable of transmitting five carriers or more may be employed. Unlike Format 1, Format 2 can notify channel aggregation of five carriers or more. For example, the index of the channel aggregation of 8 carriers using all of ch1 to ch8 is 255. In addition, the index of the channel aggregation of seven carriers using ch1 to ch6 and ch15 is 2111.

Effects

According to the present embodiment, the bonding channels of different bands can be notified. Thus, the frequency utilization efficiency can be increased. In addition, high throughput can be achieved by using D/A and A/D with low sampling rates.

In addition, a combination of channels can be notified without restriction on the number of carriers by using a small number of bits.

In addition, when channel aggregation is performed, the index value can be obtained by one of summation and logical sum (OR) of index values. For example, since the indices of ch1 and ch3 are 1 and 4, respectively, the index of aggregation of ch1 and ch3 is 5.

In Format 2, the index values is determined from two bitmaps for 2.16 GHz and 4.32 GHz. The index of channel aggregation is determined by summing the index values. Thus, aggregation of broadband channels (a bonding channel) is achieved, and the transmission rate can be increased.

In addition, since a combination of the two bitmaps for 2.16 GHz and 4.32 GHz in which the bands overlap is determined as the index representing the channels of 6.48 GHz and 8.64 GHz, the channel aggregation can be notified with a small bit width, and the transmission rate can be increased.

In addition, since the index value is determined from the two bitmaps for 2.16 GHz and 4.32 GHz, channel aggregation can be notified without restriction on the number of carriers. Thus, the transmission rate can be increased.

In Format 2, in addition to the indices illustrated in FIG. 10A and FIG. 10B, the indices illustrated in FIGS. 11A and 11B may be defined and used for future expansion.

Figure 12:
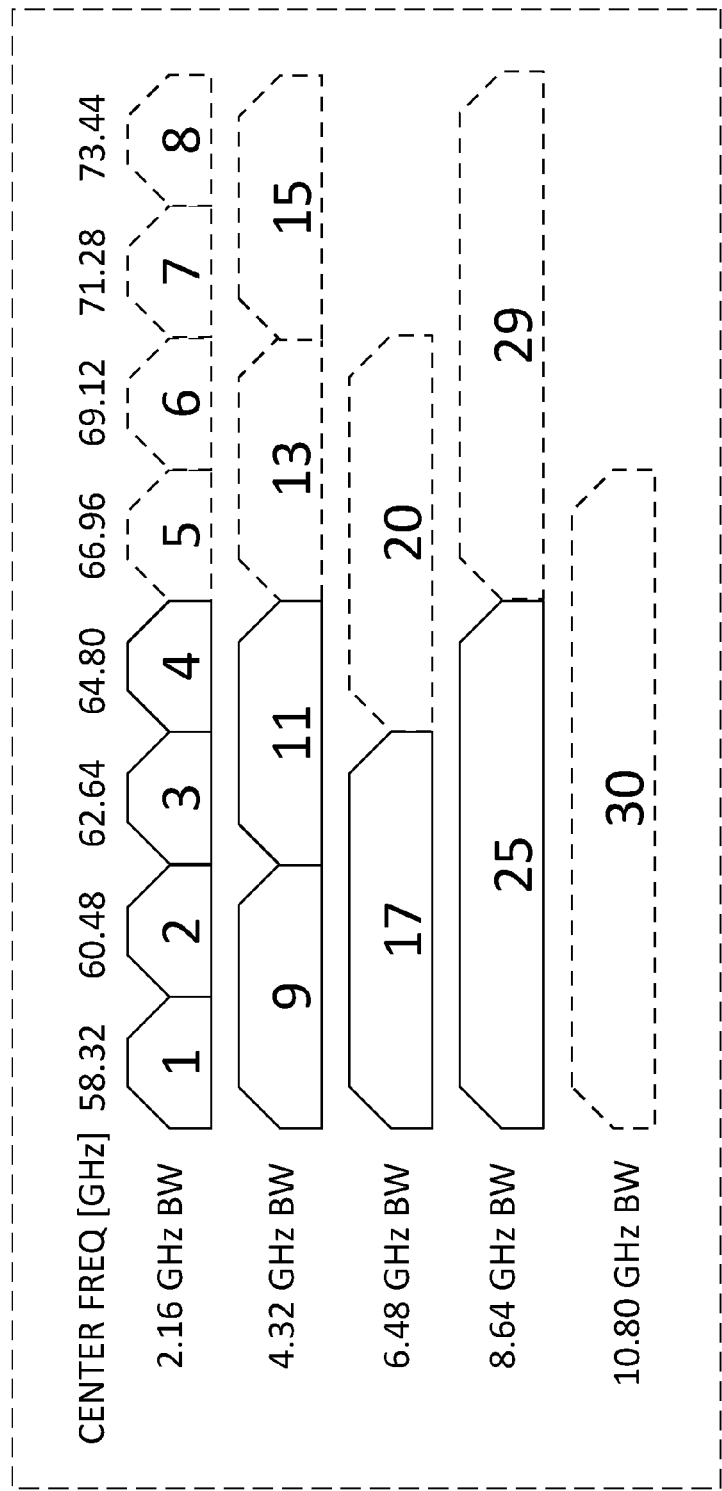
FIG. 12 is a diagram illustrating channelization (an example of ch30)

Index values and bitmap values in FIG. 11A are described below. In FIG. 10B, since the index value 257 is defined as ch17, the index value 261, for example, represents the aggregation of ch17 and ch3. However, ch17 and ch3 are an invalid combination because the bands overlap. Accordingly, the index value 261 is defined as an index representing another channel, not an aggregation of ch17 and ch3. For example, ch30 (not illustrated in FIG. 3) is added, and the index value of ch30 is set to 261. An example of channelization including ch30 is illustrated in FIG. 12. For example, the ch30 has a channel bandwidth of 10.80 GHz, and the center frequency of ch30 is the same as the center frequency of the channel ch3.

For example, by using Format 2, the index of aggregation of ch30 and ch15 is determined to be 2309 (the sum of the index 261 of ch30 and the index 2048 of ch15).

Since this index value is not the same as the index value of any other channel defined in FIG. 10A, FIG. 10B, FIG. 11A, and FIG. 11B, the reception device 200 can identify that the index indicates the aggregation of ch30 and ch15 upon receipt of the index.

FIGS. 11A and 11B illustrate combinations of channels of 2.16 GHz (except for those illustrated in FIG. 10B) having a band that overlaps the band of one of ch17, ch20, ch25, and ch29. Since these combinations are invalid, these combinations may be used for future extensions (e.g., channels of new bandwidths).

That is, the values illustrated in FIGS. 11A and 11B may be used as an indices each indicating a single bonding channel (the case where channel aggregation is not performed). If channel aggregation is performed, each of the values can be used to indicate any valid combination of channels (i.e., combination of channels having no overlapping bands) by adding any one of the index values defined in FIGS. 10A, 10B, 11A, and 11B to the value.

Format 3 Indicating Channel Selection Information

Like Format 2, in Format 3, the bitmaps for 2.16 GHz and 4.32 GHz are used. FIG. 13A is the same as FIG. 10A.

Like FIG. 10B, in FIG. 13B, each of ch17, ch20, ch25, and ch29 is indicated by using an index indicating an invalid combination for aggregation. However, unlike FIG. 10B, all the bits corresponding to the 2.16 GHz channel occupying the band are set to 1.

For example, since ch17 occupies the bands of ch1, ch2, and ch3, each of the lower 3 bits of the 2.16 GHz channel bitmap field is set to 1. In addition, to generate an index indicating an invalid combination, the least significant bit (corresponding to ch9) of the 4.32 GHz channel bitmap field is set to 1. At this time, the value of the 4.32 GHz channel bitmap field is selected such that all of the bands are included in the band occupied by ch17. That is, each of ch9 and ch11 overlaps ch17. However, ch11 also uses a band which is not included in ch17. Thus, ch11 is not selected but ch9 is selected, and the index value of ch17 is set to 263.

Similarly, in ch20, "1" is set at each of the bit positions of the 2.16 GHz channel bitmap field corresponding to ch4, ch5, and ch6, which are the 2.16 GHz channels having the bands occupied by ch20. In addition, "1" is set at the bit position of the 4.32 GHz channel bitmap field corresponding to the 4.32 GHz channel ch13 whose entire band is included in the band occupied by ch20.

In ch25, "1" is set at each of the bit positions of the 2.16 GHz channel bitmap field corresponding to ch1 to ch4, which are the 2.16 GHz channels having the bands occupied by ch25. In addition, "1" is set at the bit position of the 4.32 GHz channel bitmap field corresponding to ch11, which is a 4.32 GHz channel having the band the entirety of which is included in the band occupied by ch25. In this case, the entire band of ch9 and the entire band of ch25 are included in the band occupied by ch25. To distinguish ch25 from ch17, in ch25, the bit corresponding to ch11 instead of the bit corresponding to ch9 is set to 1. Similarly, in ch29, "1" is set at each of the bit positions corresponding to ch4 to ch8 and ch15. Likewise, a new bonding channel not included in the channelization of FIG. 3 can be added. For example, by setting each of the bits corresponding to ch1 to ch5, ch9, and ch11 to 1, ch30 illustrated in FIG. 12 can be added.

According to Format 3, "1" is set at the bit positions of the 2.16 GHz channel bitmap corresponding to all of the 2.16 GHz band channels occupied by the channel aggregation frame. Thus, upon receiving a frame, the terminal can determine which channel is being used even when the terminal does not support channel aggregation.

In the future, even when a terminal that does not understand a newly added index due to future expansion receives a channel aggregation frame, the terminal can determine which channel is occupied by referring to the 2.16 GHz channel bitmap field.

In addition, since the 2.16 GHz channel bitmap and the 4.32 GHz channel bitmap are combined and transmitted, the channel selection information about a channel aggregation frame including a channel with a band wider than 4.32 GHz can be sent. As a result, high-speed transmission can be achieved.

Format 4 Indicating Channel Selection Information

According to the present embodiment, the transmission device 100 transmits a channel aggregation frame in the case where the channel bandwidth is the same among carriers. That is, the channel bandwidths of the first to fourth carriers are the same. The channel aggregation illustrated in each of FIGS. 5A and 5B is achieved, and the channel aggregation illustrated in each of FIGS. 5C and 5D is not achieved.

The transmission device 100 uses Format 4 illustrated in FIG. 14 and sends the channel selection information in the channel aggregation frame.

The BW field indicates a channel bandwidth common to the first to fourth carriers.

The Primary channel number field notifies the channel number of the primary channel. The primary channel is one of 2.16 GHz bandwidth channels (ch1 to ch8). In addition, the first carrier includes the band of the primary channel. Consequently, the reception device 200 can determine the channel number of the first carrier from the value of the BW field and the value of the Primary channel number field. For example, when the value of the BW field is 2 and the value of the Primary channel number field is 3, it is determined that the channel having such values is ch17 from the channelization illustrated in FIG. 3. Thus, the reception device can determine that the first carrier is ch17.

The Partial-channel-number-of-2nd-carrier field sends a notification of the lower 3 bits of the channel number of the second carrier. From the combination of the value of this field and the value of the BW field, the reception device 200 can identify the channel number of the second carrier.

For example, the value of the BW field is 3 and the value of the Partial-Channel-number-of-2nd-carrier field is 1, the second carrier uses ch25.

Similarly, the Partial-channel-number-of-3rd-carrier field sends a notification of the lower 3 bits of the channel number of the third carrier. From the combination of the value of this field and the value of the BW field, the reception device 200 can identify the channel number of the third carrier.

Similarly, the Partial-channel-number-of-4th-carrier field sends a notification of the lower 3 bits of the channel number of the fourth carrier. From the combination of the value of this field and the value of the BW field, the reception device 200 can identify the channel number of the fourth carrier.

Note that if transmission using the second carrier is not performed, the value of the Partial-channel-number-of-2nd-carrier field is set to a value the same as the value of the Primary channel number field. In this manner, any one of 1 to 4 is selected as the number of carriers, and transmission can be performed without adding a field used to notify the number of carriers.

In Format 4, the lower bits of the channel number of each of the second to fourth carriers are transmitted by using the Partial-channel-number-of-2nd-carrier field, the Partial-channel-number-of-3rd-carrier field, and the Partial-channel-number-of-4th-carrier field, respectively. Consequently, the number of bits used to transmit the channel selection information can be reduced, and the data transmission rate can be increased.

Format 5 Indicating Channel Selection Information

According to the present embodiment, like Format 4 illustrated in FIG. 14, the transmission device 100 transmits a channel aggregation frame so that the channel bandwidths of the carriers are the same. That is, the channel bandwidths of the first to fourth carriers are the same. The channel aggregation illustrated in each of FIGS. 5A and 5B is achieved, and the channel aggregation illustrated in each of FIGS. 5C and 5D is not achieved. Format 5 is illustrated in FIG. 15A.

The Primary channel number field indicates the channel number of the primary channel. Like Format 4, the first carrier uses a channel of a band part of which is the band of the primary channel.

The BW index field is an index representing a combination of the channel bandwidth of the first to fourth carriers, the number of carriers, and the channel.

The relationship among the value of the BW index field, the channel bandwidth of the first to fourth carriers, and the number of carriers is determined as illustrated in FIG. 15B.

A method for determining the BW index for a combination of channels is described below. In the following description, let $c1$ be a value obtained by subtracting 1 from the primary channel number. Let $c2$ to $c4$ be values obtained by subtracting 1 from the Partial channel numbers of the second to fourth carriers, respectively. Here, each of $c1$ to $c4$ is a value in the range of 0 to 7.

(BW Index=0)

When the channel bandwidth is 2.16 GHz and the number of carriers is 1, the BW index is 0. The channel number of the first carrier is the same as the value of the Primary channel number field.

(BW Index=1 to 7)

When the channel bandwidth is 2.16 GHz and the number of carriers is 2, the BW index is any one of 1 to 7. The transmission device 100 determines the value of BW index as follows:

$$BW\_index=(c2-c1) \bmod 8.$$

In addition, the reception device 200 calculates the values of $c1$ and $c2$ from the received BW index and the value of the primary channel number as follows:

$$c2=(c1+BW\_index) \bmod 8.$$

(BW Index=8 to 28)

When the channel bandwidth is 2.16 GHz and the number of carriers is 3, the BW index is 8 to 28. The transmission device 100 determines BW_index as follows:

In the case where $(c2-c1-1) \bmod 8$ is 2 or less, $$(c2-c1-1) \bmod 8 + ((c3-c1-1) \bmod 8)*3+8.$$

Otherwise, $$(5-(c2-c1-1)) \bmod 8 + (6-(c3-c1-1) \bmod 8)*3+8.$$

The reception device 200 calculates the values of $c2$ and $c3$ from the received BW index and the value of the primary channel number as follows:

If $t1<t2$, $$c2=(c1+t1+1) \bmod 8, \text{ and } c3=(c1+t2+1) \bmod 8$$

Otherwise, $$c2=(6+c1-t1) \bmod 8, \text{ and } c3=(7+c1-t2) \bmod 8,$$

where $t1=(BW\_index-8) \bmod 3$, and $t2=\text{floor}((BW\_index-8)/3)$.

The case in which BW index=8 to 28 is described in detail below. FIG. 16 is a diagram illustrating a combination of channels when the BW index is 8.

When the channel number of the first carrier (the bandwidth is 2.16 GHz and, therefore, the channel number is the same as the primary channel number) is ch1, the channel numbers of the second and third carriers are ch7 and ch8, respectively. In addition, when the first carrier is ch2, the channel numbers of the second and third carriers are ch8 and ch1, respectively. As described above, even when the number of the value of BW index is one (for example, the BW index=8), the BW index is designed to indicate different combinations of the channel numbers of the second and third carriers in accordance with the primary channel number. Consequently, a large number of combinations can be identified by a small number of bits. According to the present embodiment, since the Primary channel number can be one of eight values, one value of the BW_index can identify eight combinations of channels.

For example, in the case where the BW_index is 8, if the second carrier is fixed to ch7 and the third carrier is fixed to ch8, the combination of BW_index being 8 and Primary channel being ch7 or ch8 is invalid. Thus, the number of combinations available when BW_index is 8 is six.

(BW Index=29 to 63)

When the channel bandwidth is 2.16 GHz and the number of carriers is 4, the BW index is 29 to 63. The transmission device 100 determines the value of BW index in a manner described below.

First, for calculation, the values of $c2'$, $c3'$, and $c4'$ are calculated as follows:

$$c2'=(c2-c1)\bmod 8, c3'=(c3-c1)\bmod 8, \text{ and } c4'=(c4-c1)\bmod 8.$$

(1) The following description is given on the basis of the case where at least two of the three channels excluding the primary channel are contiguous.

This case includes the case where the primary channel is located between two channels. In addition, ch8 and ch1 are considered as being contiguous. That is, for example, when ch8 is the primary channel, ch7 and ch1 are considered as being contiguous.

The values of c2, c3, and c4 are determined such that the two adjacent channels are c2, c3, and the rest is c4. At this time, c2 and c3 are selected such that $(c3'-c2') \bmod 7=1$. That is, the value of c2 is determined in accordance with the adjacent left channel, and the value of c3 is determined in accordance with the channel on the right. In addition, when three channels are contiguous, c2, c3, and c4 are selected such that $c2'$ and $c4'$ are not adjacent to each other.

For example, if the Primary channel is ch3 and the other channels are ch2, ch4, and ch5, selection is made so that c1=2, c2=1, c3=3, and c4=4. At this time, $c2'=7$, $c3'=1$, and $c4'=2$.

The value of the BW index is determined as follows:

$$\text{BW\_index}=((c4'-c2'-2)\bmod 7)+(c2'-1)*4+29.$$

Note that the value of BW index is 29 to 56.

When the value of BW index is 29 to 56, the reception device 200 calculates c2, c3, and c4 from BW_index as follows:

$$c2'=\text{floor}((\text{BW\_index}-29)/4)+1, c2=(c2'+c1)\bmod 8,$$

$$c3'=(c2'+1)\bmod 7, c3=(c3'+c1)\bmod 8,$$

$$c4'=((\text{BW\_index}-29)\bmod 4+c2'+2)\bmod 7, \text{ and } c4=(c4'+c1)\bmod 8.$$

(2) The following description is given on the basis of the case where any two of the three channels excluding the primary channel are not contiguous. In this case, c2, c3, and c4 are determined such that $c3'=(c2'+2) \bmod 7$, and $c4'=(c3'+2) \bmod 7$.

For example, if the Primary channel is ch7 and the other channels are ch2, ch5, and ch8, c1=6, c2=4, c3=7, and c4=1. At this time, $c2'=6$, $c3'=1$, and $c4'=3$. It leads $c3'=(c2'+2) \bmod 7$ and $c4'=(c3'+2) \bmod 7$.

The value of BW_index is determined as follows:

$$\text{BW\_index}=c2'-1+57$$

where the value of BW index is 57 to 63.

When the value of BW index is 57 to 63, the reception device 200 calculates c2, c3, and c4 from BW_index and the primary channel number, as follows:

$$c2'=\text{BW\_index}-57+1, c2=(c2'+c1)\bmod 8,$$

$$c3'=(c2'+2)\bmod 7, c3=(c3'+c1)\bmod 8,$$

$$c4'=(c3'+2)\bmod 7, \text{ and } c4=(c4'+c1)\bmod 8.$$

(BW index=64)

When the channel bandwidth is 4.32 GHz and the number of carriers is 1, the BW index is 64.

(BW Index=65 to 67)

When the channel bandwidth is 4.32 GHz and the number of carriers is 2, the BW index is 65 to 67.

The transmission device 100 determines the value of BW index as follows:

$$\text{Let } c1'=\text{floor}(c1/2), \text{ and let } c2'=\text{floor}(c2/2).$$

$$\text{Then, BW\_index}=(c2'-c1')\bmod 8+64.$$

When the value of the BW index is 65 to 67, the reception device 200 calculates c2 from the values of the BW index and the primary channel number, as follows:

$$c1'=\text{floor}(c1/2), \text{ and}$$

$$c2=c1'*2+(\text{BW\_index}-64)*2.$$

(BW Index=68 to 70)

When the channel bandwidth is 4.32 GHz and the number of carriers is 3, the BW index is 68 to 70.

The transmission device 100 determines the value of BW index as follows.

$$\text{Let } c1'=\text{floor}(c1/2), \text{let } c2'=\text{floor}(c2/2), \text{ and let } c3'=\text{floor}(c3/2).$$

However, the order of c2 and c3 is determined such that c1, c2, and c3 are in a cyclic order. That is, the order of c2 and c3 is interchanged so that $(c2-c1) \bmod 8<(c3-c1) \bmod 8$.

At this time, the BW index is calculated as follows:

$$\text{BW\_index}=((c2'-c1'-1)\bmod 2)*2+(c3'-c2'-1)\bmod 2+68.$$

When the value of the BW index is 68 to 70, the reception device 200 calculates c2 and c3 from the values of the BW index and the Primary channel number, as follows:

$$c1'=\text{floor}(c1/2),$$

$$c2'=((c1'+\text{floor}(\text{BW\_index}-68)/2)\bmod 4),$$

$$c3'=(c2'+\text{floor}(\text{BW\_index}-68)\bmod 2),$$

$$c2=c2'*2, \text{ and}$$

$$c3=c3'*2.$$

(BW Index=71)

When the channel bandwidth is 4.32 GHz and the number of carriers is 4, the BW index is 71. As the combination of channels, only one combination of ch9, ch11, ch13, and ch15 is provided.

When the value of the BW index is 71, the reception device 200 calculates c2, c3, and c4 from the value of the Primary channel number, as follows:

$$c1'=\text{floor}(c1/2),$$

$$c2=(c1'*2+2)\bmod 8,$$

$$c3=(c2+2)\bmod 8, \text{ and}$$

$$c4=(c3+2)\bmod 8.$$

That is, c2 to c4 are determined such that c1 to c4 are in a cyclic order.

(BW Index=72)

When the channel bandwidth is 6.48 GHz and the number of carriers is 1, the BW index is 72. The channel used is ch17 or ch20.

The reception device 200 can determine which one of ch17 and ch20 is used from the value of the Primary channel number. That is, if the primary channel is any one of ch1 to ch3, the channel used is ch17. However, if the primary channel is any one of ch4 to ch6, the channel used is ch20.
(BW Index=73)

When the channel bandwidth is 6.48 GHz and the number of carriers is 2, the BW index is 73. As the combination of channels used, only one combination of ch17 and ch20 is provided.
(BW Index=74)

When the channel bandwidth is 8.64 GHz and the number of carriers is 1, the BW index is 74. The channel used is ch25 or ch29.

The reception device 200 can determine which one of ch25 and ch29 is being used from the value of the Primary channel number. That is, if the primary channel is any one of ch1 to ch4, the channel used is ch25. However, if the primary channel is any one of ch5 to ch8, the channel used is ch29.
(BW Index=75)

When the channel bandwidth is 8.64 GHz and the number of carriers is 2, the BW index is 75. As the combination of channels used, only one combination of ch25 and ch29 is provided.
(BW Index=76 to 127)

A BW index value in the range of 76 to 127 is reserved for future expansion. If a new channel bandwidth is added or if five or more carriers are set up, these values are used.
Format 6 Indicating Channel Selection Information Like Format 2, the 2.16 GHz bitmap is used in Format 6. However, instead of a 4.32 GHz bitmap, a Maximum bandwidth field is added. FIG. 17 illustrates Format 6.

The Maximum bandwidth field contains the specified maximum channel bandwidth used by the corresponding packet. For example, even when the transmission device 100 is capable of transmitting packets on a maximum of 8.64 GHz bandwidth, a value of "1", which indicates 4.32 GHz, is set in the Maximum bandwidth field upon performing aggregation of 2.16 GHz and 4.32 GHz for a corresponding packet.

In the 2.16 GHz channel bitmap field, "1" is set at all of the bit positions corresponding to the 2.16 GHz channel numbers that correspond to the band occupied by one of the 2.16 GHz to 8.64 GHz channels. For example, when ch9 is used, each of the bits corresponding to ch1 and ch2 (the lower 2 bits of the 2.16 GHz channel bitmap field) is set to 1.

In the case where "2.16 GHz+2.16 GHz" aggregation transmission is performed by using ch1 and ch2, the transmission device 100 sets 0 in the Maximum bandwidth field. In the case where 4.32 GHz band channel bonding transmission is performed by using ch9, the transmission device 100 sets 1 in the Maximum bandwidth field. Thereafter, the transmission device 100 performs transmission. Alternatively, in the case where aggregation transmission is performed by using ch9 and ch3, the transmission device 100 sets 1 in the Maximum bandwidth field and sets 1 in each of the lower 3 bits of the 2.16 GHz channel bitmap field (corresponding to ch1 to ch3). Thereafter, the transmission device 100 performs transmission.

In this manner, by performing transmission by using Format 6, the transmission device 100 can specify a combination of channels with a small number of bits and can perform channel aggregation including a plurality of channel bandwidths. As a result, high-speed transmission can be achieved.

Figure 18:
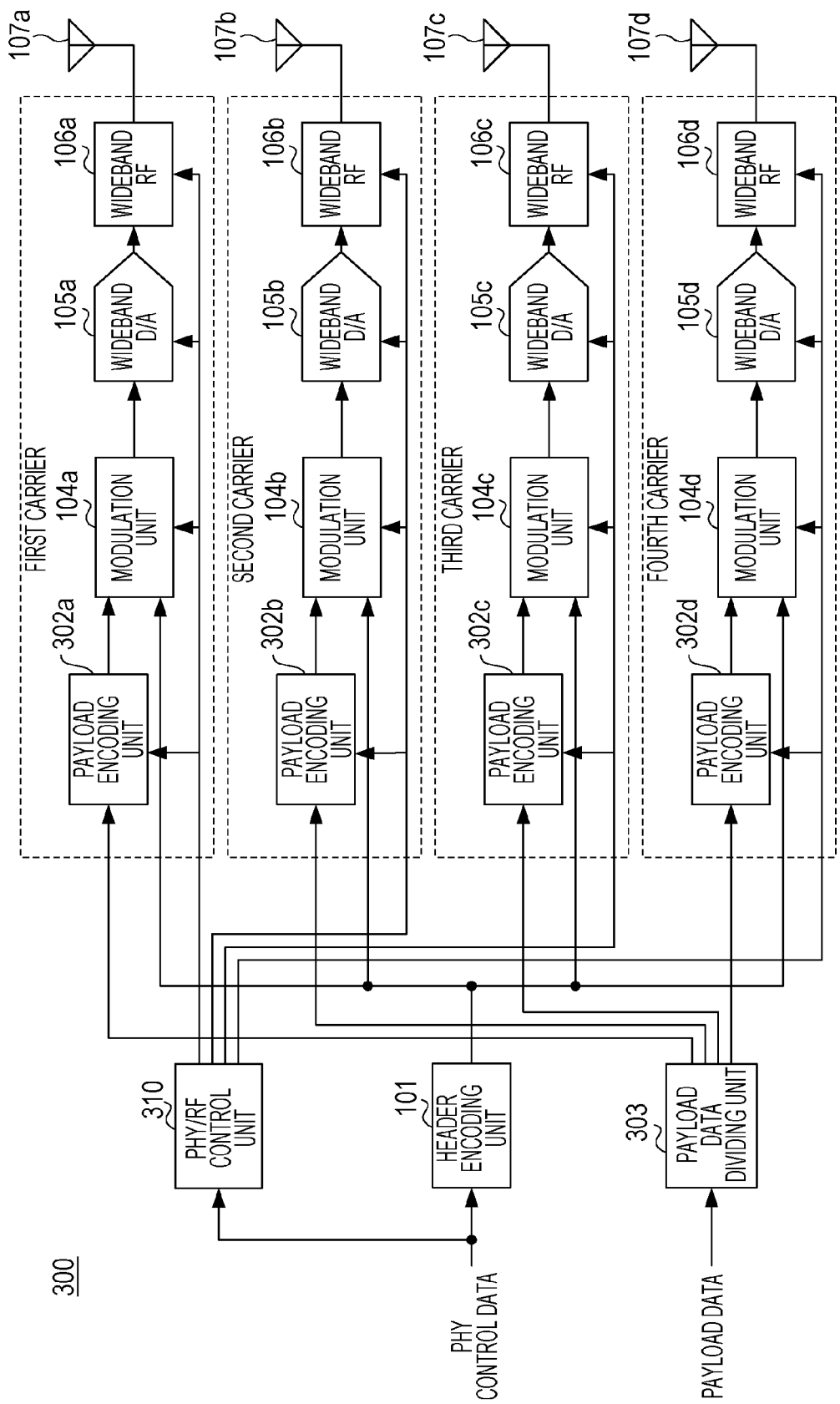
FIG. 18 is a diagram illustrating another configuration of the transmission device that supports channel aggregation.

In addition, in Format 6, the 2.16 GHz channel bitmap indicates the band usage. Consequently, the reception device 200 can be aware of the bands being used even when the reception device 200 receives an unknown combination of channels.
Description of Transmission Device and Reception Device FIG. 18 illustrates another configuration of the transmission device that performs channel aggregation. The same reference numbers are used for elements of a transmission device 300 that are the same or similar to those of the transmission device 100, and description of the elements is not repeated.

The transmission device 300 includes a payload data dividing unit 303 having a function that differs from that of the payload data dividing unit 103 of the transmission device 100. The transmission device 300 divides the payload data and allocate the divided pieces of payload data to first to fourth carriers before encoding the payload. Note that the payload data dividing unit 303 may add a CRC (error detection code) to the payload and perform bit scrambling before dividing the payload.

Payload encoding units 302a to 302d perform LDPC encoding on the payload data of each of the first to fourth carriers. The payload encoding units 302a to 302d may perform LDPC coding with different coding rates for the first to fourth carriers, respectively. In addition, the payload encoding units 302a to 302d may perform LDPC encoding using different LDPC check matrices for the first to fourth carriers, respectively.

The modulation units 104a to 104d modulate the payload data of the first to fourth carriers. Note that the modulation units 104a to 104d may use different modulation schemes for the first to fourth carriers. Examples of the modulation scheme include π/2-BPSK, π/2-QPSK, π/2-16QAM, and π/2-64QAM. Symbols obtained after data modulation may be transmitted by single carrier, or symbols obtained after data modulation may be transmitted by OFDM.

A PHY/RF control unit 310 outputs, to each of the payload encoding units 302a to 302d, an instruction signal indicating which encoding rate is used in LDPC encoding on the basis of the PHY control data. In addition, the PHY/RF control unit 310 outputs, to each of the modulation units 104a to 104d, an instruction signal indicating which one of data modulation schemes is applied. That is, the PHY control data may include different MCSs (Modulation and Coding Schemes) for the carriers, and the PHY/RF control unit 310 may apply different MCSs to the carriers.

In addition to the channel selection information (any one of Formats 1 to 6), the header encoding unit 101 sets the MCS information regarding each of the carriers in the header (L-Header or E-Header) and encodes the header. FIG. 20A, FIG. 20B, FIG. 21A, and FIG. 21B illustrate a method for setting the MCS information regarding each of the carriers in the header (described below).

Figure 19:
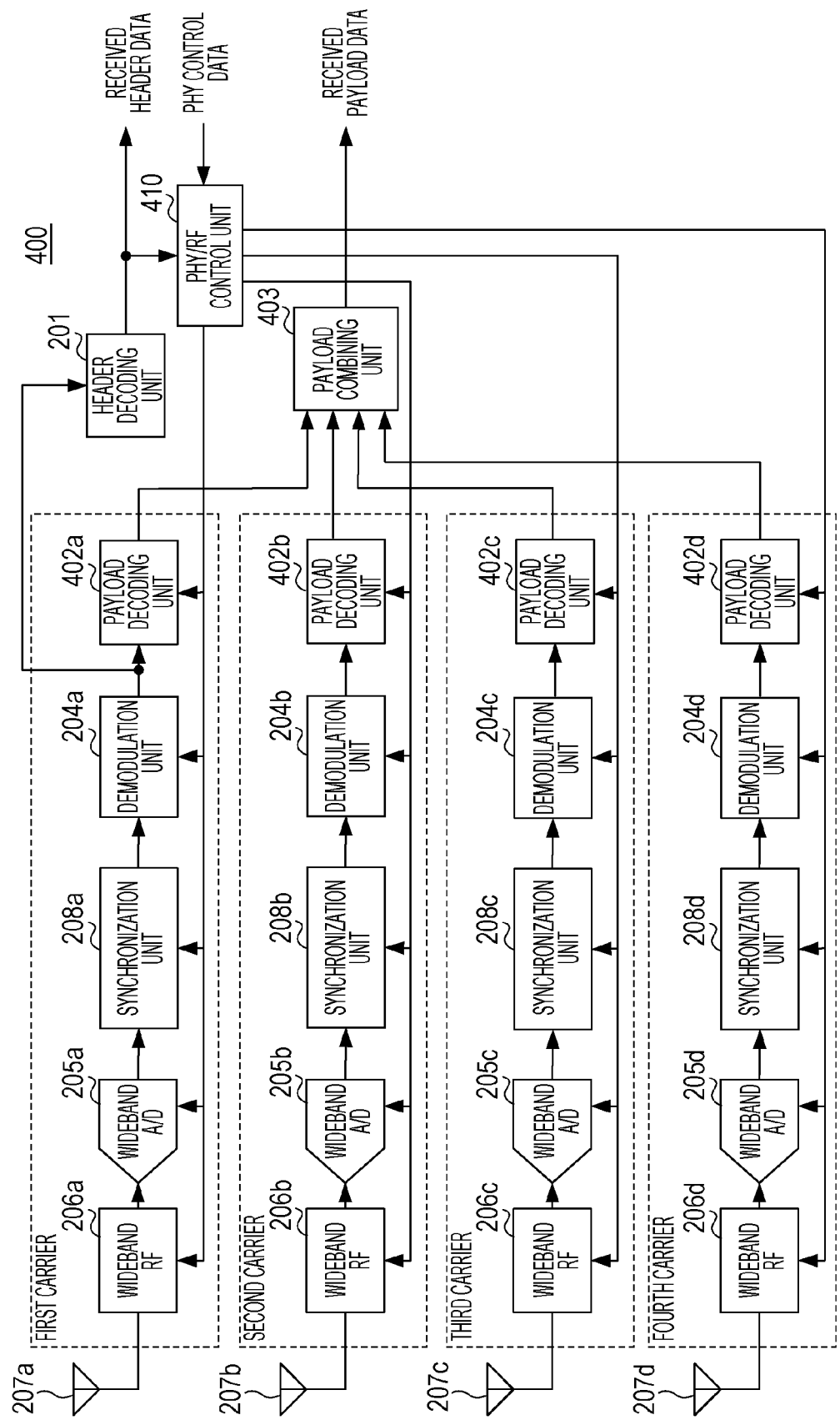
FIG. 19 is a diagram illustrating another configuration of the reception device that supports channel aggregation.

FIG. 19 illustrates another configuration of the reception device that supports channel aggregation. The same reference numbers are used for elements of a reception device 400 that are the same or similar to those of the reception device 200, and description of the elements is not repeated.

Unlike the reception device 200, the reception device 400 includes payload decoding units 402a to 402d each corresponding to one of the carriers. The payload decoding units 402a to 402d perform LDPC decoding (error correction).

The payload decoding units 402a to 402d may perform LDPC decoding using different coding rates and different check matrices each corresponding to one of the payload decoding units 402a to 402d in accordance with an instruction from a PHY/RF control unit 410 (described below).

A payload combining unit 403 combines the data output from the payload decoding units 402a to 402d each corresponding to one of the carriers and generates reception data. Note that the payload combining unit 403 may descramble the data and perform CRC check.

The PHY/RF control unit 410 determines the center frequency of each of the carriers, the channel bandwidth of each of the carriers, and the MCS for each of the carriers on the basis of the PHY header information received by the header decoding unit 201 and the PHY control data sent from the MAC processing unit in advance.

MCS Notification in Single User (SU) Transmission

In the case of single user transmission, the transmission device 300 sets the MCS selection information illustrated in FIG. 20A in the header in addition to the channel selection information (any one of Formats 1 to 6).

In FIG. 20A, the header has eight fields (Stream1 MCS to Stream8 MCS). When the number of carriers is 1 (that is, when carrier aggregation is not performed), the transmission device 300 sets the MCS number of the first carrier (that is, the MCS number used by the payload encoding unit 302a and the modulation unit 104a) in the Stream1 MCS field. When MIMO transmission is performed by the first carrier, MIMO transmission of a maximum of 8 streams is performed by using the Stream2 MCS field to the Stream8 MCS field. That is, MIMO transmission of a maximum of 8 streams may be performed by multiplexing each of the payload encoding unit 302a, the modulation unit 104a, the wideband D/A 105a, the wideband RF 106a, and the antenna 107a, which constitute the first carrier section of the transmission device 300, for a maximum of 8 streams.

That is, unlike the configuration in FIG. 18, the payload encoding unit 302a of the transmission device 300 includes a payload encoding unit 302a1 to a payload encoding unit 302a8 to MIMO-transmit a maximum of 8 streams on one channel. The modulation unit 104a includes a modulation unit 104a1 to a modulation unit 104a8. The wideband D/A 105a includes a wideband D/A 105a1 to a wideband D/A 105a8. The wideband RF 106a includes a wideband RF 106a1 to a wideband RF 106a8. The antenna 107a includes an antenna 107a1 to an antenna 107a8. For example, the stream 1 is transmitted via the payload encoding unit 302a1, the modulation unit 104a1, the wideband D/A 105a1, the wideband RF 106a1, and the antenna 107a1.

The payload encoding unit 302a sets the MCS number used by the payload encoding unit 302a1 in the Stream1 MCS field and sets the MCS number used by the payload encoding unit 302a8 in the Stream8 MCS field. Note that the data encoded by the payload encoding unit 302a1 to the payload encoding unit 302a8 are referred to as "Stream 1 to Stream 8", respectively.

In addition, in the wideband RF 106a, all of the wideband RF 106a1 to the wideband RF 106a8 use a common channel number. That is, the first carrier is transmitted by using one of the channels. The common channel number is notified by using any one of Formats 1 to 6 described above. That is, when performing MIMO transmission on the first carrier, a common channel (a single channel) may be used for Streams 1 to 8, while different MCSs may be used for Streams 1 to 8.

That is, when the number of carriers is 1, the first carrier can perform MIMO transmission of a maximum of eight streams by using eight transmission branches.

When the number of carriers is 2, the transmission device 300 sets the MCS number of the first carrier in the Stream1 MCS field and sets the MCS number of the second carrier in the Stream5 MCS field. When MIMO transmission is performed on the first carrier, MIMO transmission of a maximum of 4 streams is performed by using the Stream1 MCS to Stream4 MCS fields. When MIMO transmission is performed on the second carrier, MIMO transmission of a maximum of 4 streams is performed by using the Stream5 MCS field to the Stream8 MCS field. That is, a maximum of 8 streams are transmitted with the first carrier and the second carrier.

That is, when the number of carriers is 2, MIMO transmission of a maximum of 8 streams can be performed by using a total of eight transmission branches (the four transmission branches for the first carrier and the four transmission branches for the second carrier).

When the number of carriers is 3, the transmission device 300 sets the MCS number of the first carrier in the Stream1 MCS field, sets the MCS number of the second carrier in the Stream4 MCS field, and sets the MCS number of the third carrier in the Stream7 MCS field. When performing MIMO transmission on the first carrier, MIMO transmission of a maximum of 3 streams is performed by using the Stream1 MCS field to the Stream3 MCS field. When performing MIMO transmission on the second carrier, MIMO transmission of a maximum of three streams is performed by using the Stream4 MCS field to the Stream6 MCS field. When performing MIMO transmission on the third carrier, MIMO transmission of a maximum of two streams is performed by using the Stream7 MCS field and the Stream8 MCS field. That is, a maximum of eight streams are transmitted with the first carrier to the third carrier.

That is, when the number of carriers is 3, MIMO transmission of a maximum of 8 streams can be performed by using the three transmission branches of the first carrier, the three transmission branches of the second carrier, and the two transmission branches of the third carrier, that is, the eight transmission branches in total.

Similarly, when the number of carriers is 4, the transmission device 300 sets the MCS numbers of the first carrier to the fourth carrier in the Stream1 MCS field, Stream3 MCS field, Stream5 MCS field, and Stream7 field, respectively. Likewise, the transmission device 300 transmits a maximum of 8 streams with the first carrier to the fourth carrier.

That is, in the case where the number of carriers is 4, two transmission branches are used for the first carrier, two transmission branches are used for the second carrier, two transmission branches are used for the third carrier, and two transmission branches are used for the fourth carrier. That is, by using eight transmission branches in total, MIMO transmission of a maximum of 8 streams can be performed.

Note that instead of using the format illustrated in FIG. 20A, the format illustrated in FIG. 20B may be used. In FIG. 20B, the field number used can be calculated as follows:

(Field No.)=(Carrier No.)+(The number of carriers)× (stream No.−1).

For example, in the case where the carrier number is 2, the number of carriers is 3, and the stream number is 3, the field number is 8. Therefore, the MCS of the stream is notified by using the Stream8 MCS field.

In this way, since the transmission device 300 can specify different MCSs for the carriers by using the header formats illustrated in FIGS. 20A and 20B, the transmission rate can be increased.

Furthermore, since the transmission device 300 uses the header formats illustrated in FIGS. 20A and 20B so that the maximum total number of MIMO streams is a predetermined number (e.g., 8) regardless of the number of carriers, the need for an additional field used to notify the MCS information for carrier aggregation is eliminated. As a result, the number of bits required for the header can be reduced and, thus, the transmission rate can be increased.

MCS Notification of Multi User (MU) Transmission

The transmission device 300 may transmit one channel aggregation packet to a plurality of users. That is, the transmission device 300 may perform multi-user transmission. That is, the user may be changed for each of the carriers, or the user may be changed for each of the streams even on the carrier.

In the case of multi-user transmission, in addition to setting the channel selection information (any one of Formats 1 to 6), a field illustrated in FIG. 21A is set in the header (E-Header).

In FIG. 21A, the header has eight fields (Stream1 Address to Stream8 Address).

When the number of carriers is 2, the transmission device 300 sets the destination address of the first carrier in the Stream1 Address field and sets the destination address of the second carrier in the Stream5 Address field. The destination address may be an AID (Association ID) or may be a MAC address or part of a MAC address. Alternatively, the destination address may be a hash value calculated from the MAC address. When performing MU-MIMO (multi-user MIMO) transmission on the first carrier, MIMO transmission of a maximum of 4 streams is performed by using the Stream1 Address field to the Stream4 Address field. When performing MU-MIMO transmission on the second carrier, MIMO transmission of a maximum of 4 streams is performed by using the Stream5 Address to the Stream8 Address field. That is, multi-user transmission destined for a maximum of 8 users is performed over the first carrier and the second carrier.

Similarly, when the number of carriers is 3 or 4, the address of each of the carriers is notified by using any one of the Stream1 Address field to the Stream8 Address field. In addition, when MU-MIMO transmission is performed, multi-user transmission destined for a maximum of 8 users is performed with all of the carriers.

When the number of carriers is 1 and MU-MIMO transmission is performed, the format illustrated in FIG. 21A is used. MIMO transmission of a maximum of 8 streams is performed on the first carrier by using the Stream1 Address field to the Stream8 Address field. Note that instead of using the format illustrated in FIG. 21A, the format illustrated in FIG. 21B may be used.

In this manner, since the transmission device 300 can specify different addresses for the carriers by using the header formats illustrated in FIGS. 21A and 21B, multi-user transmission can be performed by using a channel aggregation packet. As a result, when there are a plurality of users, the transmission rate can be increased.

In addition, by using the header formats illustrated in FIGS. 21A and 21B, the maximum total number of destination users is set to a predetermined value (for example, 8) in advance, regardless of the number of carriers. Consequently, the transmission device 300 does not require an additional field used to notify the address information for multiuser transmission in channel aggregation. As a result, the number of bits required for the header can be reduced and, thus, the transmission rate can be increased.

Another Embodiment

While the above embodiment has been described with reference to an aspect of the present disclosure implemented by hardware configuration, the present disclosure can be implemented by software in cooperation with hardware.

In addition, the functional blocks used in the description of the above embodiment are typically implemented as LSIs, which is an integrated circuits each having an input terminal and an output terminal. The integrated circuit controls the functional blocks used in the description of the above embodiment and may have an input and an output. The functional blocks may be formed as individual chips, or some or all of the functional blocks may be integrated into a single chip. The term "LSI" is used herein, but the term "IC", "system LSI", "super LSI" or "ultra LSI" may be used as well depending on the level of integration.

In addition, the circuit integration is not limited to LSI and may be achieved by dedicated circuitry or a general-purpose processor. A field programmable gate array (FPGA), which is programmable after fabrication of the LSI, or a reconfigurable processor which allows reconfiguration of connections and settings of circuit cells in LSI may be used.

Moreover, should a circuit integration technology replacing LSI appear as a result of advancements in semiconductor technology or other technologies derived from the technology, the functional blocks could be integrated using such a technology. Another possibility is the application of biotechnology, for example.

An aspect of the present disclosure is suitable for use in a communication device using millimeter wave communication.

What is claimed is:

1. A transmission device comprising:
first to (r)th modulation circuits each modulating header information about (r) carriers, where (r) is an integer greater than or equal to 1, each of the (r) carriers having, allocated thereto, at least one of first, second, and third channel groups each in the same predetermined band, the first channel group including (n) channels each having a first bandwidth, where (n) is an integer, the second channel group including (m) channels each formed from two contiguous channels of the first channel group and not duplicated each other, where (m) is an integer less than (n), the third channel group including (p) channels each formed from three contiguous channels of the first channel group and not duplicated each other, where (p) is an integer less than (m); and
first to (r)th transmission circuits that transmit pieces of the modulated header information modulated by the first to (r)th modulation circuits, respectively,
wherein the header information includes (n) bits indicating allocation of the channels of the first channel group and (m) bits indicating allocation of the channels of the second channel group, and
wherein allocation of the channels of the third channel group is indicated by a combination of the (n) bits and the (m) bits.

2. The transmission device according to claim 1, wherein in allocation of the channels of the first channel group, one channel is allocated by using one of the (n) bits, and wherein in allocation of the channels of the second channel group, one channel is allocated by using one of the (m) bits.

3. The transmission device according to claim 2, wherein to each of the channels of the third channel group, a bit allocated to a channel of the first channel group having a band that overlaps each of the channels of the third channel group among the (n) bits and a bit allocated to a channel of the second channel group having a band that overlaps each of the channels of the third channel group among the (m) bits are allocated.

4. The transmission device according to claim 3, wherein a band of a channel of the second channel group and the band of the channel of the first channel group indicated by a bit allocated to each of the channels of the third channel group have an overlapping band.

5. The transmission device according to claim 1, wherein the header information includes allocation of a fourth channel group in the predetermined band to the (r) carriers,
wherein the fourth channel group includes (q) channels each formed from four contiguous channels of the first channel group and not duplicated each other, where (q) is an integer less than (m), and
wherein channel allocation of the fourth channel group is indicated by a combination of the (n) bits and the (m) bits.

6. The transmission device according to claim 1, wherein the first to (r)th transmission circuits transmit the header information over a channel of the first channel group having a band that overlaps the channels of the second and third channel groups allocated to the carriers, respectively.

7. A reception device comprising:
first to (r)th reception circuits that receive first to (r)th signals, respectively, where (r) is an integer greater than or equal to 1;
a decoding circuit that decodes header information from any one of the first to (r)th signals;
a control circuit that controls channels used by the first to (r)th reception circuits by using the header information; and
a payload decoding circuit that decodes the first to (r)th signals output from the first to (r)th reception circuits that are channel-controlled, respectively, and outputs a payload,
wherein each of the first to (r)th signals has, allocated thereto, at least one of a first channel group including (n) channels each having a first bandwidth in a predetermined band, where (n) is an integer, a second channel group including (m) channels each formed from two contiguous channels of the first channel group and not duplicated each other, where (m) is an integer and is less than (n), and a third channel group including (p) channels each formed from three contiguous channels of the first channel group and not duplicated each other, where (p) is an integer less than (m),
wherein the header information includes (n) bits indicating allocation of the channels of the first channel group and (m) bits indicating allocation of the channels of the second channel group, and
wherein allocation of the channels of the third channel group is indicated by a combination of the (n) bits and the (m) bits.

8. The reception device according to claim 7, wherein in allocation of the channels of the first channel group, one channel is allocated by using one of the (n) bits, and wherein in allocation of the channels of the second channel group, one channel is allocated by using one of the (m) bits.

9. The reception device according to claim 8, wherein to each of the channels of the third channel group, a bit allocated to a channel of the first channel group having a band that overlaps each of the channels of the third channel group among the (n) bits and a bit allocated to a channel of the second channel group having a band that overlaps each of the channels of the third channel group among the (m) bits are allocated.

10. The reception device according to claim 8, wherein a band of a channel of the second channel group and the band of the channel of the first channel group indicated by a bit allocated to each of the channels of the third channel group have an overlapping band.

11. The reception device according to claim 7, wherein the first to (r)th reception circuits receive the header information over the channels of the first channel group having bands that overlap the channels of the allocated channel group.

12. A transmission method comprising:
modulating, by using first to (r)th modulation circuits, header information about (r) carriers, where (r) is an integer greater than or equal to 1, each of the (r) carriers having, allocated thereto, at least one of first, second, and third channel groups each in the same predetermined band, the first channel group including (n) channels each having a first bandwidth, where (n) is an integer, the second channel group including (m) channels each formed from two contiguous channels of the first channel group and not duplicated each other, where (m) is an integer less than (n), the third channel group including (p) channels each formed from three contiguous channels of the first channel group and not duplicated each other, where (p) is an integer less than (m); and
transmitting, by using first to (r)th transmission circuits, the header information modulated by the first to (r)th modulation circuits, respectively,
wherein the header information includes (n) bits indicating allocation of the channels of the first channel group and (m) bits indicating allocation of the channels of the second channel group, and
wherein allocation of the channels of the third channel group is indicated by a combination of the (n) bits and the (m) bits.

13. A reception method comprising:
receiving first to r(th) signals by using first to (r)th reception circuits, respectively, where (r) is an integer greater than or equal to 1;
decoding header information from any one of the first to (r)th signals;
controlling channels used by the first to (r)th reception circuits by using the header information; and
decoding the first to (r)th signals output from the first to (r)th reception circuits that are channel-controlled, respectively, and outputting a payload,
wherein each of the first to (r)th signals has, allocated thereto, at least one of a first channel group including (n) channels each having a first bandwidth in a predetermined band, where (n) is an integer, a second channel group including (m) channels each formed from two contiguous channels of the first channel group and not duplicated each other, where (m) is an integer and is less than (n), and a third channel group including (p) channels each formed from three contiguous channels of the first channel group and not duplicated each other, where (p) is an integer less than (m), and wherein the header information includes (n) bits indicating allocation of the channels of the first channel group and (m) bits indicating allocation of the channels of the second channel group, and wherein allocation of the channels of the third channel group is indicated by a combination of the (n) bits and the (m) bits.

\* \* \* \* \*